United States Patent
Peterka, III et al.

(10) Patent No.: US 10,689,132 B2
(45) Date of Patent: *Jun. 23, 2020

(54) METHODS AND APPARATUS FOR PERFORMING PROPULSION OPERATIONS USING ELECTRIC PROPULSION SYSTEMS

(71) Applicant: The Boeing Company, Chicago, IL (US)

(72) Inventors: James J. Peterka, III, Rancho Palos Verdes, CA (US); Glenn N. Caplin, Manhattan Beach, CA (US); Richard W. Aston, Brea, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,973

(22) Filed: Sep. 11, 2018

(65) Prior Publication Data
US 2019/0002133 A1   Jan. 3, 2019

Related U.S. Application Data

(63) Continuation of application No. 15/477,923, filed on Apr. 3, 2017, which is a continuation of application
(Continued)

(51) Int. Cl.
*B64G 1/40* (2006.01)
*B64G 1/24* (2006.01)
(Continued)

(52) U.S. Cl.
CPC .............. *B64G 1/242* (2013.01); *B64G 1/002* (2013.01); *B64G 1/007* (2013.01); *B64G 1/10* (2013.01);
(Continued)

(58) Field of Classification Search
CPC .......... B64G 1/405; B64G 1/409; B64G 1/24; B64G 1/40
See application file for complete search history.

(56) References Cited

U.S. PATENT DOCUMENTS

| | | |
|---|---|---|
| 3,145,531 A | 8/1964 | Deutsch |
| 3,420,470 A | 1/1969 | Meyer |

(Continued)

FOREIGN PATENT DOCUMENTS

| | | |
|---|---|---|
| CN | 1172751 A | 2/1998 |
| CN | 101381003 A | 3/2009 |

(Continued)

OTHER PUBLICATIONS

Japanese Patent Office, "Decision of Rejection," issued in connection with application No. 2013249017, dated Sep. 4, 2018, 7 pages.
(Continued)

*Primary Examiner* — Philip J Bonzell
(74) *Attorney, Agent, or Firm* — Hanley, Flight & Zimmerman, LLC

(57) ABSTRACT

Methods and apparatus to methods and apparatus for performing propulsion operations using electric propulsion system are disclosed. An example apparatus includes means to use an electric propulsion system coupled to a frame of a spacecraft, the electric propulsion system including at least a first thruster and a second thruster, the first thruster adjacent a first side of the frame, the second thruster adjacent a second side of the frame, and means to allow at least one of the first thruster or the second thruster to control the spacecraft without using a chemical propulsion system.

20 Claims, 18 Drawing Sheets

Related U.S. Application Data

No. 14/828,462, filed on Aug. 17, 2015, now Pat. No. 9,643,739, which is a continuation of application No. 13/693,694, filed on Dec. 4, 2012, now Pat. No. 9,180,984, which is a continuation-in-part of application No. 13/652,101, filed on Oct. 15, 2012, now Pat. No. 8,973,873, and a continuation-in-part of application No. 13/604,050, filed on Sep. 5, 2012, now Pat. No. 8,915,472.

(60) Provisional application No. 61/646,222, filed on May 11, 2012.

(51) Int. Cl.

| | | |
|---|---|---|
| *B64G 1/00* | (2006.01) | |
| *B64G 1/26* | (2006.01) | |
| *B64G 1/64* | (2006.01) | |
| *B64G 1/10* | (2006.01) | |
| B64G 1/28 | (2006.01) | |
| B64G 1/36 | (2006.01) | |
| B64G 1/42 | (2006.01) | |
| B64G 1/44 | (2006.01) | |
| B64G 1/50 | (2006.01) | |

(52) U.S. Cl.
CPC ............... *B64G 1/26* (2013.01); *B64G 1/40* (2013.01); *B64G 1/402* (2013.01); *B64G 1/405* (2013.01); *B64G 1/641* (2013.01); B64G 1/283 (2013.01); B64G 1/361 (2013.01); B64G 1/363 (2013.01); B64G 1/365 (2013.01); B64G 1/422 (2013.01); B64G 1/428 (2013.01); B64G 1/44 (2013.01); B64G 1/503 (2013.01); B64G 2001/643 (2013.01)

(56) References Cited

U.S. PATENT DOCUMENTS

| | | | |
|---|---|---|---|
| 3,929,306 A | 12/1975 | Faget et al. | |
| 4,345,861 A | 8/1982 | Aarseth | |
| 4,682,744 A | 7/1987 | Gounder | |
| 4,829,784 A | 5/1989 | Berg et al. | |
| 5,199,672 A | 4/1993 | King et al. | |
| 5,383,631 A | 1/1995 | Mazzini | |
| 5,397,082 A | 3/1995 | Scott | |
| 5,411,226 A | 5/1995 | Jones et al. | |
| 5,522,569 A | 6/1996 | Steffy et al. | |
| 5,529,264 A | 6/1996 | Bedegrew et al. | |
| 5,595,360 A * | 1/1997 | Spitzer | B64G 1/007 244/158.5 |
| 5,604,430 A * | 2/1997 | Decker | G05F 1/67 136/293 |
| 5,605,308 A | 2/1997 | Quan et al. | |
| 5,613,653 A | 3/1997 | Bombled et al. | |
| 5,716,029 A | 2/1998 | Spitzer et al. | |
| 5,765,780 A * | 6/1998 | Barskey | B64G 1/24 244/164 |
| 5,947,421 A * | 9/1999 | Beattie | F03H 1/0037 244/171.1 |
| 5,984,236 A | 11/1999 | Keitel et al. | |
| 6,032,904 A * | 3/2000 | Hosick | B64G 1/26 244/169 |
| 6,135,394 A * | 10/2000 | Kamel | B64G 1/242 244/158.8 |
| 6,138,951 A | 10/2000 | Budris et al. | |
| 6,206,327 B1 | 3/2001 | Benedetti et al. | |
| 6,260,805 B1 * | 7/2001 | Yocum, Jr. | B64G 1/26 244/164 |
| 6,267,330 B1 | 7/2001 | Cochran | |
| 6,341,749 B1 * | 1/2002 | Ocampo | B64G 1/007 244/158.5 |
| 6,357,698 B1 | 3/2002 | DiVerde et al. | |
| 6,543,723 B1 | 4/2003 | Oh | |
| 6,565,043 B1 | 5/2003 | Wittmann | |
| 6,581,880 B2 * | 6/2003 | Randolph | B64G 1/242 244/169 |
| 6,637,701 B1 * | 10/2003 | Glogowski | B64G 1/242 244/164 |
| 6,739,555 B2 | 5/2004 | Mazanek et al. | |
| 6,789,767 B2 | 9/2004 | Mueller et al. | |
| 6,845,950 B1 | 1/2005 | Goodzeit et al. | |
| 7,059,571 B2 * | 6/2006 | Kellberg | B64G 1/405 244/169 |
| 7,113,851 B1 | 9/2006 | Gelon et al. | |
| 7,138,960 B2 | 11/2006 | Carroll et al. | |
| 7,216,833 B2 | 5/2007 | D'Ausilio et al. | |
| 7,216,834 B2 | 5/2007 | D'Ausilio et al. | |
| 7,219,858 B2 | 5/2007 | Sharer | |
| 7,658,414 B2 | 2/2010 | Watanabe et al. | |
| 7,686,255 B2 | 3/2010 | Harris | |
| 8,016,240 B2 | 9/2011 | Caplin et al. | |
| 8,136,765 B2 | 3/2012 | Geneste et al. | |
| 8,152,108 B2 * | 4/2012 | Becker-Irvin | B64G 1/425 244/172.7 |
| 8,196,868 B2 | 6/2012 | Kutter et al. | |
| 8,393,582 B1 | 3/2013 | Kutter et al. | |
| 8,499,874 B2 | 8/2013 | Dewis et al. | |
| 8,511,617 B2 | 8/2013 | Caplin et al. | |
| 8,915,472 B2 | 12/2014 | Aston et al. | |
| 8,973,873 B2 | 3/2015 | Aston et al. | |
| 9,180,984 B2 | 11/2015 | Peterka, III et al. | |
| 2002/0179775 A1 * | 12/2002 | Turner | B64G 1/1078 244/172.5 |
| 2002/0179776 A1 | 12/2002 | Mueller et al. | |
| 2003/0075645 A1 * | 4/2003 | Randolph | B64G 1/242 244/169 |
| 2004/0164205 A1 | 8/2004 | Kellberg | |
| 2006/0016934 A1 | 1/2006 | Sharer | |
| 2008/0149777 A1 | 6/2008 | Benedict et al. | |
| 2008/0237399 A1 | 10/2008 | Caplin et al. | |
| 2009/0057492 A1 | 3/2009 | Harris | |
| 2009/0101757 A1 | 4/2009 | Brandhorst, Jr. | |
| 2009/0224105 A1 | 9/2009 | Caplin et al. | |
| 2010/0176248 A1 | 7/2010 | Terziakin | |
| 2010/0264275 A1 | 10/2010 | Behruzi et al. | |
| 2012/0097796 A1 | 4/2012 | Munir et al. | |
| 2012/0097797 A1 | 4/2012 | Woo et al. | |
| 2012/0210852 A1 | 8/2012 | McCants, Jr. | |
| 2012/0227374 A1 | 9/2012 | Zegler | |
| 2013/0299641 A1 | 11/2013 | Aston et al. | |
| 2014/0061386 A1 | 3/2014 | Peterka, III et al. | |
| 2014/0103164 A1 | 4/2014 | Aston et al. | |
| 2017/0297747 A1 | 10/2017 | Peterka, III et al. | |

FOREIGN PATENT DOCUMENTS

| | | |
|---|---|---|
| CN | 103448919 | 12/2013 |
| EP | 0937644 | 8/1999 |
| EP | 2662287 | 11/2013 |
| EP | 2662289 | 11/2013 |
| JP | S6250299 | 3/1987 |
| JP | 03193597 | 8/1991 |
| JP | 07-089499 | 4/1995 |
| JP | H9277997 | 10/1997 |
| JP | H11291998 | 10/1999 |
| JP | 2000168697 A | 6/2000 |
| JP | 2010537880 | 12/2010 |
| WO | 0156883 | 8/2001 |
| WO | 2009048678 | 4/2009 |

OTHER PUBLICATIONS

Valentian et al., "SPT sizing for integrated propulsion systems," AIAA, ASME, SAE, and ASEE, Joint Propulsion Conference and Exhibit, 32nd, Lake Buena Vista, FL, Jul. 1-3, 1996, American Institute of Aeronautics and Astronautics, Inc., 8 pages.

United States Patent and Trademark Office, "Non-final Office Action," issued in connection with U.S. Appl. No. 13/652,101, dated Apr. 11, 2014, 21 pages.

(56) References Cited

OTHER PUBLICATIONS

United States Patent and Trademark Office, "Notice of Allowance," issued in connection with U.S. Appl. No. 13/652,101, dated Oct. 17,2014, 15 pages.
Spaceflight Now, "Two Broadcasting Satellites Share Proton Rocket Ride," Jul. 15, 2011, [http://www.spaceflightnow.com/proton/ses3/ ], retrieved on Aug. 17, 2015, 4 pages.
United States Patent and Trademark Office, "Non-final Office Action," issued in connection with U.S. Appl. No. 13/604,050, dated Feb. 14, 2014, 19 pages.
United States Patent and Trademark Office, "Notice of Allowance," issued in connection with U.S. Appl. No. 13/604,050, dated May 20, 2014, 13 pages.
United States Patent and Trademark Office, "Non-final Office Action," issued in connection with U.S. Appl. No. 13/693,694, dated Nov. 5, 2014, 20 pages.
United States Patent and Trademark Office, "Final Office Action," issued in connection with U.S. Appl. No. 13/693,694, dated Feb. 25, 2015, 17 pages.
United States Patent and Trademark Office, "Notice of Allowance," issued in connection with U.S. Appl. No. 13/693,694, dated May 15, 2015, 28 pages.
United Kingdom Intellectual Property Office, "Combined Search and Examination Report," issued in connection with GB Patent Application No. GB1316482.7, dated Apr. 4, 2014, 4 pages.
European Patent Office, "European Search Report," issued in connection with European Application No. 13167339.4, dated Sep. 26, 2013, 7 pages.
Porte et al., "Benefits of Electric Propulsion for Orbit Injection of Communication Spacecraft," International Communication Sattelite Systems Conference and Exhibit, pp. 1-9, Mar. 22, 1992, 9 pages.
Maihe et al., "Design of a Hybrid Chemical/Electric Propulsion Orbital Transfer Vehicle," Journal of Spacecraft and Rockets, vol. 39, No. 1, pp. 131-139, Jan. 2002, 9 pages.
United States Patent and Trademark Office, "Non-final Office Action," issued in connection with U.S. Appl. No. 14/828,462, dated Jul. 26, 2016, 41 pages.
United States Patent and Trademark Office, "Notice of Allowance," issued in connection with U.S. Appl. No. 14/828,462 , dated Jan. 11, 2017, 18 pages.
Canadian Intellectual Property Office, "Office Action," issued in connection with Canadian Patent Application No. 2,831,309, dated May 13, 2016, 3 pages.
Canadian Intellectual Property Office, "Office Action," issued in connection with Canadian Patent Application No. 2,831,309, dated Jan. 15, 2015, 4 pages.
State Intellectual Property Office of China, "Notification of Secon Office Action," issued in connection with Chinese Application No. 2013106477607, dated Jul. 12, 2017, 24 pages.
European Patent Office, "Extended European Search Report," issued in connection with EP Application No. 13194767.3, dated Nov. 24, 2017, 8 pages.
Japanese Patent Office, "Notice of Reasons for Rejection," issued in connection with JP Application No. 2013-249017, dated Dec. 5, 2017, 7 pages.
State Intellectual Property Office of China, "Notification of the Decision of Rejection," issued in connection with Chinese Application No. 2013106477607, dated Jan. 19, 2018, 20 pages.

United States Patent and Trademark Office, "Non-final Office Action," issued in connection with U.S. Appl. No. 15/477,923, dated Jun. 16, 2017, 12 pages.
United States Patent and Trademark Office, "Final Office Action," issued in connection with U.S. Appl. No. 15/477,923, dated Oct. 30, 2017, 14 pages.
United States Patent and Trademark Office, "Advisory Action," issued in connection with U.S. Appl. No. 15/477,923, dated Dec. 29, 2017, 17 pages.
United States Patent and Trademark Office, "Notice of Allowance," issued in connection with U.S. Appl. No. 15/477,923, dated Mar. 21, 2018, 7 pages.
United States Patent and Trademark Office, "Notice of Allowance," issued in connection with U.S. Appl. No. 15/477,923, dated Apr. 9, 2018, 2 pages.
United States Patent and Trademark Office, "Notice of Allowance," issued in connection with U.S. Appl. No. 15/477,923, dated Apr. 25, 2018, 6 pages.
United States Patent and Trademark Office, "Notice of Allowance," issued in connection with U.S. Appl. No. 15/477,923, dated May 10, 2018, 9 pages.
United States Patent and Trademark Office, "Notice of Allowance," issued in connection with U.S. Appl. No. 15/477,923, dated Jul. 25, 2018, 3 pages.
European Patent Office, "Office Action," dated May 3, 2019, in connection with European Patent Application No. 13194767.3 (6 pages).
European Patent Office Boards of Appeal, "Summons to Oral Proceedings," dated Nov. 30, 2018, in connection with European Patent Application No. 13167339.4 (11 pages).
Japanese Patent Office, "Notice of Reasons for Rejection," issued in connection with application No. 2013-249017, dated Oct. 29, 2019, 13 pages.
State Intellectual Property Office of the People's Republic of China, "First Office Action," dated Nov. 16, 2016 in connection with Chinese Patent Application No. 2013106477607, 27 pages (full document with English translation attached).
State Intellectual Property Office of the People's Republic of China, "Third Office Action," dated Jul. 26, 2019 in connection with Chinese Patent Application No. 2013106477607, 6 pages (full document with English translation attached).
United States Patent and Trademark Office, "Notice of Allowance," dated Jun. 5, 2019 in connection with U.S. Appl. No. 15/477,923, 5 pages.
United States Patent and Trademark Office, "Notice of Allowance," dated Sep. 10, 2019 in connection with U.S. Appl. No. 15/477,923, 5 pages.
Japanese Patent Office, "Notice of Reasons for Rejection," dated Feb. 25, 2020, in connection with Japanese Patent Application No. 2019-000258, 11 pages.
Stephen Clark "Electric propulsion could launch new commercial trend," Spaceflight Now, Mar. 19, 2012 (6 pages).
D.M. Goebel M. Martinez-Lavin, T.A. Bond, A.M. King, "Performance of XIPS Electric Propulsion in On-orbit Station Keeping of the Boeing 702 Spacecraft." 38th AIAA/ASME/SAE/ASEE Joint Propulsion Conference & Exhibit, Jul. 7-10, 2002, Indianapolis, Indiana (6 pages).
Japanese Patent Office, "Notice of Reasons for Rejection," dated Mar. 3, 2020, in connection with Japanese Patent Application No. 2013-249017, 40 pages.

* cited by examiner

METHODS AND APPARATUS FOR PERFORMING PROPULSION OPERATIONS USING ELECTRIC PROPULSION SYSTEMS

RELATED APPLICATIONS

This patent arises from a continuation of U.S. patent application Ser. No. 15/477,923, filed Apr. 3, 2017, which arises from a continuation of U.S. patent application Ser. No. 14/828,462, filed Aug. 17, 2015, which arises from a continuation of U.S. patent application Ser. No. 13/693,694, filed Dec. 4, 2012, which arises from a continuation-in-part of U.S. patent application Ser. No. 13/604,050, filed Sep. 5, 2012, and a continuation-in-part of U.S. patent application Ser. No. 13/652,101, filed Oct. 15, 2012, which claims priority to U.S. Patent Application No. 61/646,222, filed May 11, 2012. Priority is claimed to U.S. patent application Ser. No. 15/477,923, U.S. patent application Ser. No. 14/828,462, U.S. patent application Ser. No. 13/693,694, U.S. patent application Ser. No. 13/604,050, U.S. patent application Ser. No. 13/652,101, and U.S. Patent Application No. 61/646,222. U.S. patent application Ser. No. 15/477,923, U.S. patent application Ser. No. 14/828,462, U.S. patent application Ser. No. 13/693,694, U.S. patent application Ser. No. 13/604,050, U.S. patent application Ser. No. 13/652,101, and U.S. Patent Application No. 61/646,222 are hereby incorporated herein by reference in their entirety.

FIELD OF THE DISCLOSURE

This patent relates to electric propulsion systems and, more specifically, to methods and apparatus for performing propulsion operations using electric propulsion systems.

BACKGROUND

Spacecrafts and/or satellites may perform propulsion operations in space. Some of these propulsion operations may include attitude and momentum control, orbit raising, orbit insertion and maintenance, orbit repositioning and/or de-orbit maneuvers. Other propulsion operations may include escaping orbits for interplanetary or extra-solar system missions and/or injection maneuvers to initiate orbit around another planet, moon, etc. Thrust is achieved by acceleration of propellants. Propellants may be accelerated substantially by pressure differences (cold or hot gas systems, (e.g., cold gas)), chemical reactions (including catalytic decomposition, e.g. hydrazine monopropellant systems, hypergolic bipropellant reactions, solid rockets, etc.), and electrical and magnetic interactions (including ion propulsion systems, stationary plasma systems, Hall effect thrusters, magneto-plasma thrusters, etc., (e.g., electric propulsion)). To perform these propulsion operations, some satellites use cold gas systems, or chemical systems, or combinations of cold gas and chemical systems, or combinations of cold gas, chemical and electric propulsion systems.

SUMMARY

An example method includes deploying a space vehicle including an electric propulsion system; and using the electric propulsion system for attitude control and orbit control, no other propulsion system provided to enable the attitude control and the orbit control.

An apparatus includes a space vehicle including means for performing propulsion operations without using a chemical propulsion system.

An example method includes deploying a space vehicle from a launch vehicle; and performing propulsion operations of the space vehicle without using a chemical propulsion system.

The features, functions, and advantages that have been discussed can be achieved independently in various embodiments or may be combined in yet other embodiments further details of which can be seen with reference to the following description and drawings.

DETAILED DESCRIPTION

Figure 1:
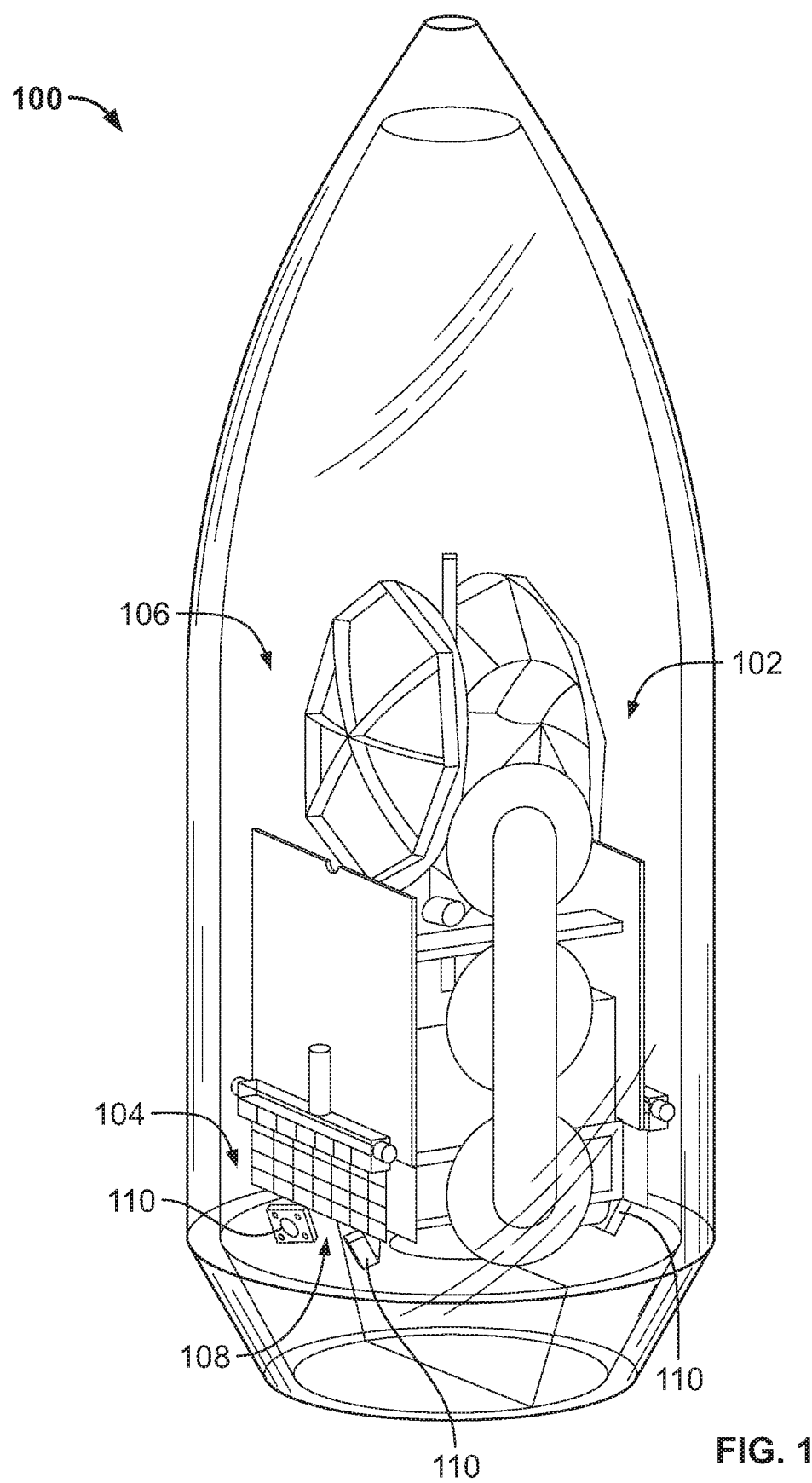
FIG. 1 depicts an example launch vehicle and an example spacecraft in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification.

Any features from any example may be included with, a replacement for, or otherwise combined with other features from other examples.

The examples disclosed herein relate to satellite modules, satellites and/or spacecrafts that use electric propulsion systems (e.g., ion propulsion system, plasma propulsion system such as stationary plasma propulsion systems, Hall Effect propulsion system, etc.) and/or attitude control systems for all propulsion operations and/or mission requirements. The propulsion maneuvers or operations and/or mission requirements may include attitude and momentum control, orbit raising, orbit insertion and maintenance, orbit repositioning, de-orbit maneuvers, etc. Attitude and momentum control include controlling position and rates of various elements of the spacecraft about each axis, exchange of momentum between spacecraft elements, and utilization and responding to external torques, momentum management, etc. Propulsive maneuvers may provide linear acceleration to change and control orbital parameters such as orbit raising and/or lowering, change in inclination, etc.

By using such an ion propulsion system, the mass of the satellite at launch may be reduced by hundreds of kilograms, the mission life may be extended and/or the processing, production and/or launch costs may be reduced. For example, reducing the mass of the satellite reduces the cost of the launch vehicle. Additionally, using such an electric propulsion system enables the satellite to be repositioned into different orbits and/or orbital slots using substantially less propellant than if a chemical and/or hybrid propulsion system were used.

In contrast, some known satellites use chemical propellants in chemical reaction control for propulsion operations. Other known satellites use electric propulsion in combination with chemical propellants and/or cold gas propulsion systems. However, the cost of the example electric propulsion system is significantly less than some of these known systems (e.g., chemical and electric propulsion systems) due to their complex design and/or the cost of procurement, assembly, integration and/or testing.

By not using chemical propulsion systems, the propulsion systems of the examples disclosed herein eliminate chemical loading operations during the satellite design qualification, acceptance and/or pre-launch preparation at the subsystem level and/or the system level. Thus, electric propulsion systems, which typically use an inert gas propellant, may be installed early in the satellite manufacturing process (e.g., at the fuel tank level) at conventional processing facilities without the risk of exposure to hazardous materials and/or without violating hazardous material processing laws in any state and/or country.

Additionally, by not using chemical propulsion systems, the propulsion systems of the examples disclosed herein are not hazardous to humans and/or the environment and are not limited to being loaded at the launch site in controlled areas. In some examples, chemical propulsion systems use chemicals that are caustic, highly reactive, explosive and/or toxic. Thus, spacecraft fueling operations of chemical propulsion systems are conducted using hazardous materials (HAZMAT) suits and/or other fueling equipment at the launch site. For example, when fueling chemical propulsion systems, special fueling stands, rooms, protection and/or fuel certification may be used and/or needed. Chemical propulsion systems may also expose hardware of the spacecraft to hazardous materials, such as during fueling operations, which require the hardware to be cleaned and/or refurbished prior to re-use, for example.

FIG. 1 depicts an example single launch vehicle 100 in which a spacecraft, unmanned spacecraft and/or satellite 102 is positioned in its stowed configuration. In this example, the spacecraft 102 includes power sources 104, payloads 106 and an electric propulsion system 108. The power sources 104 may include a solar array, radioactive thermonuclear generators (RTGs), energy beaming or transfer apparatus, solar thermal, nuclear thermal, etc. The payloads 106 may include an antenna, a radio frequency (RF) receiver/transmitter, an optical receiver/transmitter, a LASER receiver/transmitter, a light detection and ranging (LIDAR) receiver/transmitter, RADAR receiver/transmitter and/or imaging/detecting systems. The electric propulsion system 108 includes thrusters (e.g., four ion thrusters) 110 that carry out all propulsion operations, including momentum control, orbit raising, orbit insertion and maintenance, orbit repositioning, de-orbit maneuvers, etc. Thus, the spacecraft 102 does not include other propulsion systems, such as chemical or cold gas propulsion systems.

Figure 2:
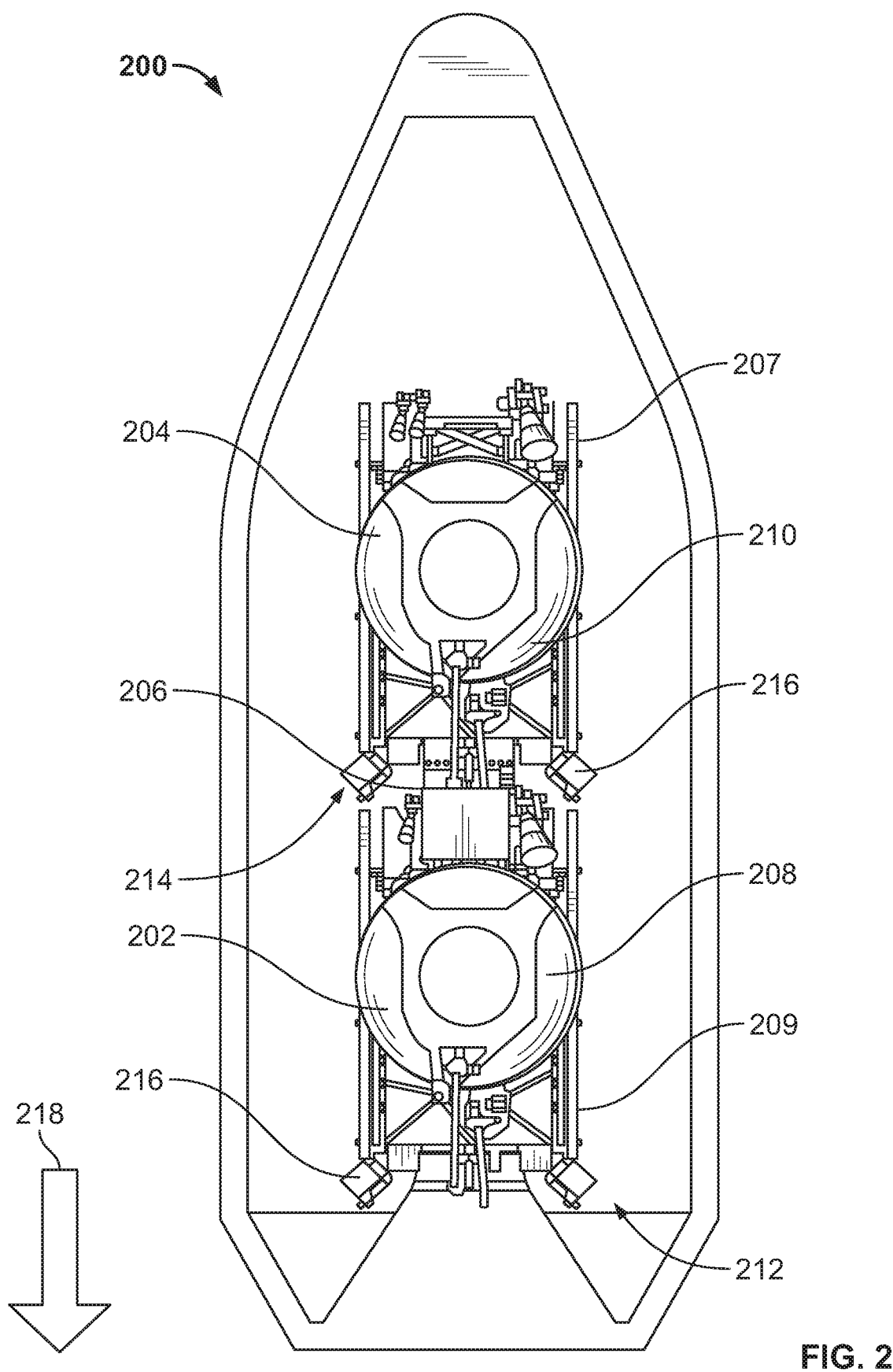
FIG. 2 depicts an example launch vehicle and example first and second spacecrafts and/or modules in accordance with the teachings of this disclosure.

FIG. 2 depicts an example dual launch vehicle 200 in which first and second example spacecrafts, unmanned spacecrafts, modules (e.g., re-entry modules), satellite modules, and/or satellites 202, 204 are positioned in their stowed configuration. Within the launch vehicle 200, the first and second spacecrafts 202, 204 are stacked and/or coupled using an example interface 206. The interface 206 enables the spacecrafts 202, 204 to separate after the spacecrafts 202, 204 are deployed from the launch vehicle 200, for example. Although FIG. 2 illustrates two stacked spacecraft, it is possible to stack more than two spacecraft and/or alternatively arrange them in other configurations, such as in a side-by-side configuration.

The spacecrafts 202, 204 include respective frames 207, 209 that include accommodations for and/or couplings for antennas 208, 210. The spacecrafts 202, 204 also include electric propulsion systems 212, 214 having thrusters (e.g., four Xenon ion thrusters, ion thrusters) 216 that carry out some or all momentum control, and all orbit raising, orbit insertion and maintenance, orbit repositioning, de-orbit maneuvers, etc. To control the position of the spacecrafts 202, 204 once deployed from the launch vehicle 200, the thrusters 216 are independently movable and/or rotatable relative to the respective spacecraft 202, 204 and/or the frames 207, 209. For example, to thrust the first spacecraft 202 forward, the thrusters 216 may be positioned in a direction generally indicated by arrow 218.

Figure 3:
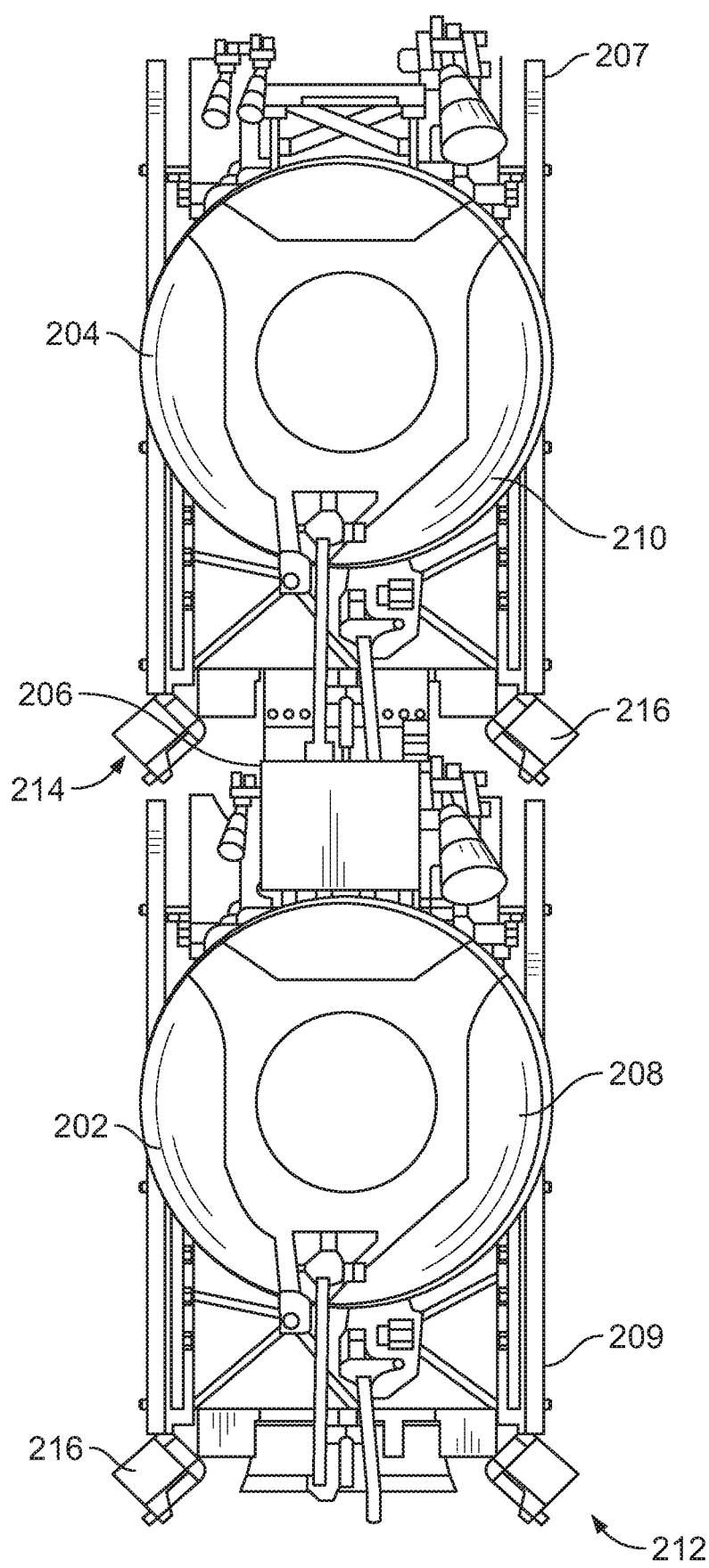
FIG. 3 depicts an isometric view of the example first and second spacecrafts and/or modules of FIG. 2.
Figure 4:
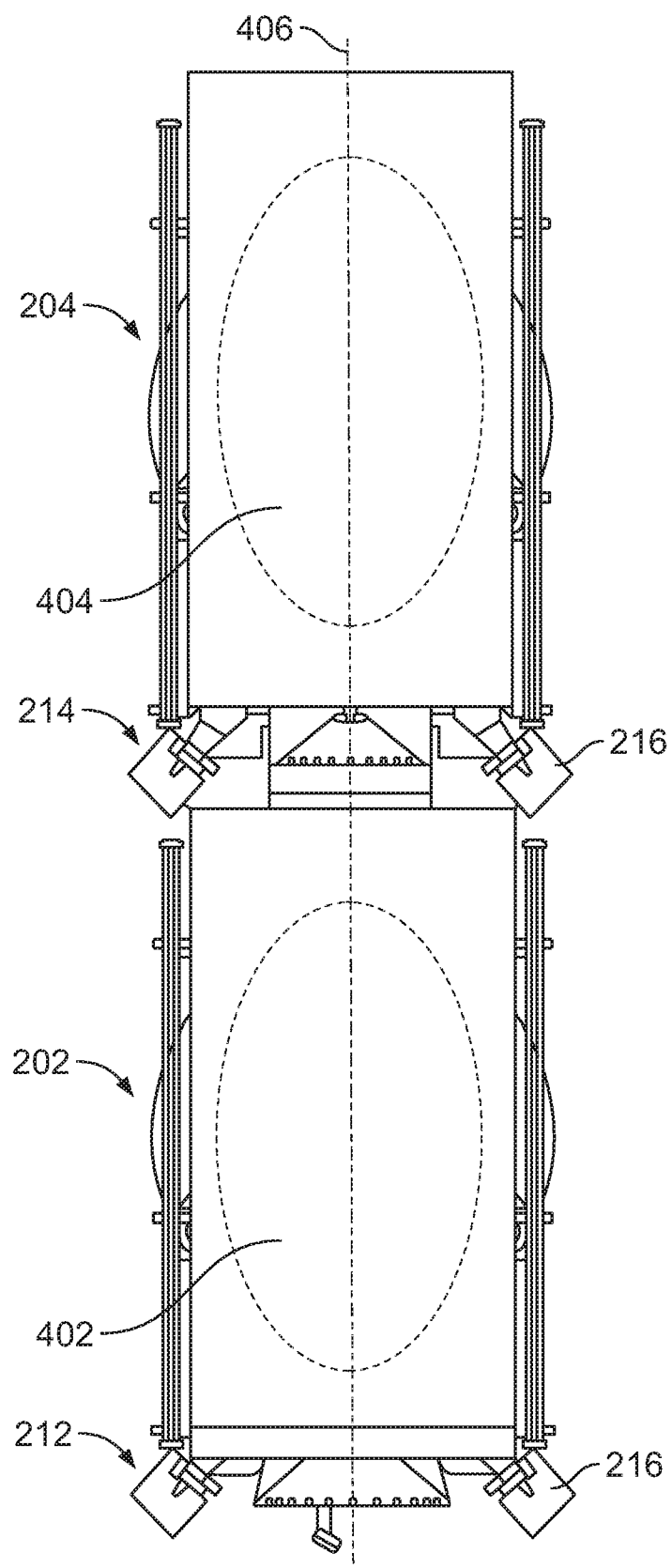
FIG. 4 depicts a cross-sectional view of the example first and second spacecrafts and/or modules of FIG. 2.

FIGS. 3 and 4 depict the stacked spacecrafts 202, 204 deployed from the launch vehicle 200. Alternatively, rather than deploying the stack from the launch vehicle 200, each spacecraft 202, 204 may be deployed separately from the launch vehicle 200, with the upper spacecraft 204 deployed prior to the lower spacecraft 202. Referring to FIG. 4, the example propulsion systems 212, 214 include tanks (e.g., Xenon tanks) 402, 404 that may be positioned along a longitudinal axis 406 of the spacecrafts 202, 204. In operation, the respective tanks 402, 404 are coupled to and provide propellant to one or more of the thrusters 216 to perform the various propulsion operations. The propellant provided may be an inert gas such as Xenon, Argon, Krypton, etc., or other species, such as Mercury. While the example spacecrafts 202, 204 each have a single tank 402, 404, any other number of tanks (e.g., 2, 3, 4, etc.) may be used and may be similarly or differently placed within the respective spacecrafts 202, 204.

Figure 5:
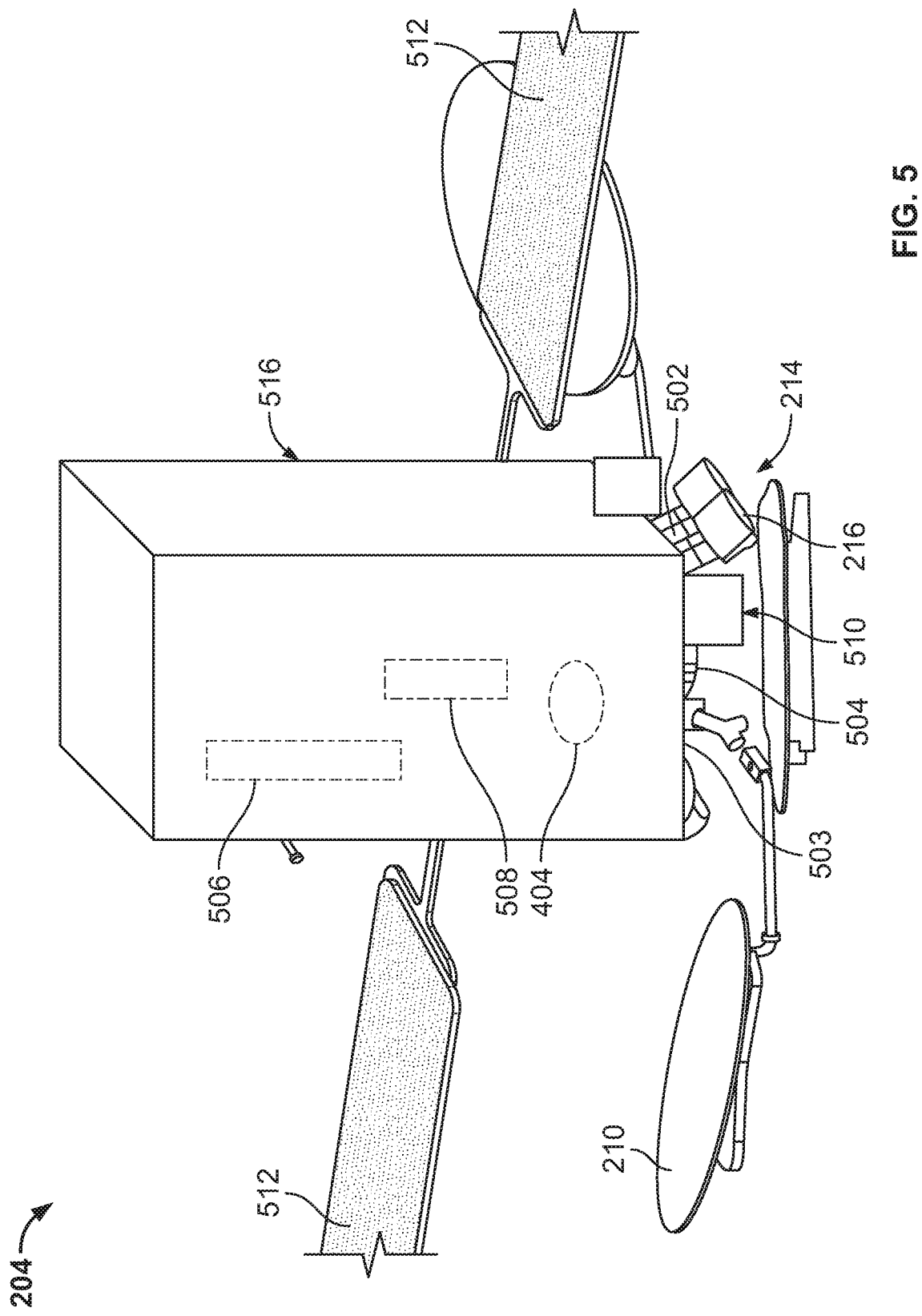
FIG. 5 depicts one of the spacecrafts and/or modules of FIG. 2 in a deployed configuration.

FIG. 5 depicts the spacecraft 204 in the deployed configuration. The second spacecraft 204 includes the thrusters 216 that are pivotably mounted to supports 502 and the tank 404 that is coupled to and/or supported by a support and/or tank support 504. In some examples, the second spacecraft 204 includes an attitude control system and/or reaction and/or momentum control wheels 503 that cooperate to provide attitude control and/or momentum storage for the second spacecraft 204. In some examples, the attitude control system 503 is an electrically powered attitude control system such as a magnetic torque rod(s), a magnetic torque ring(s) and/or an electrically driven electro-mechanical attitude control system which may be a combination of control wheels and magnetic rods/rings. In some examples, the propulsion system 214 and/or the thrusters 216 include Xenon ion propulsion (XIP) thrusters, power controllers, tankage, flow control and cross-strapping units. In some examples, the second spacecraft 204 also includes an electronics module 506, payload equipment 508 and a battery and power controller 510. The second spacecraft 204 may also include the antennas 210, solar panels and/or arrays 512 and thermal radiators and/or equipment panels 516.

The electronics module 506 may include spacecraft control electronics, flight software and/or telemetry and command radio frequency (RF) units. The attitude control system 503 may include attitude sensors (e.g., earth sensors, sun sensors, star trackers), Inertial Reference Units (IRUs) or other attitude sensors, reaction wheels or momentum wheels, torque rods or magnetic torquers, etc. The battery and power controller 510 may include battery cells, e.g. Lithium-Ion cells, packs and power controllers. The antennas 210 may receive and/or transmit data and may include active and passive units, antenna structure, a deployment mechanism and/or an antenna positioning mechanism. The solar arrays 512 may include one or more panels, covered in whole or in part with solar cells. The thermal radiators and equipment panels 516 may include a single north oriented radiator and/or equipment, a single south oriented radiator and/or equipment and heat pipes. While the above examples describe the second spacecraft 204 as including particular elements and/or a particular number of those elements, the second spacecraft 204 may include different and/or different quantities of elements.

Figure 6:
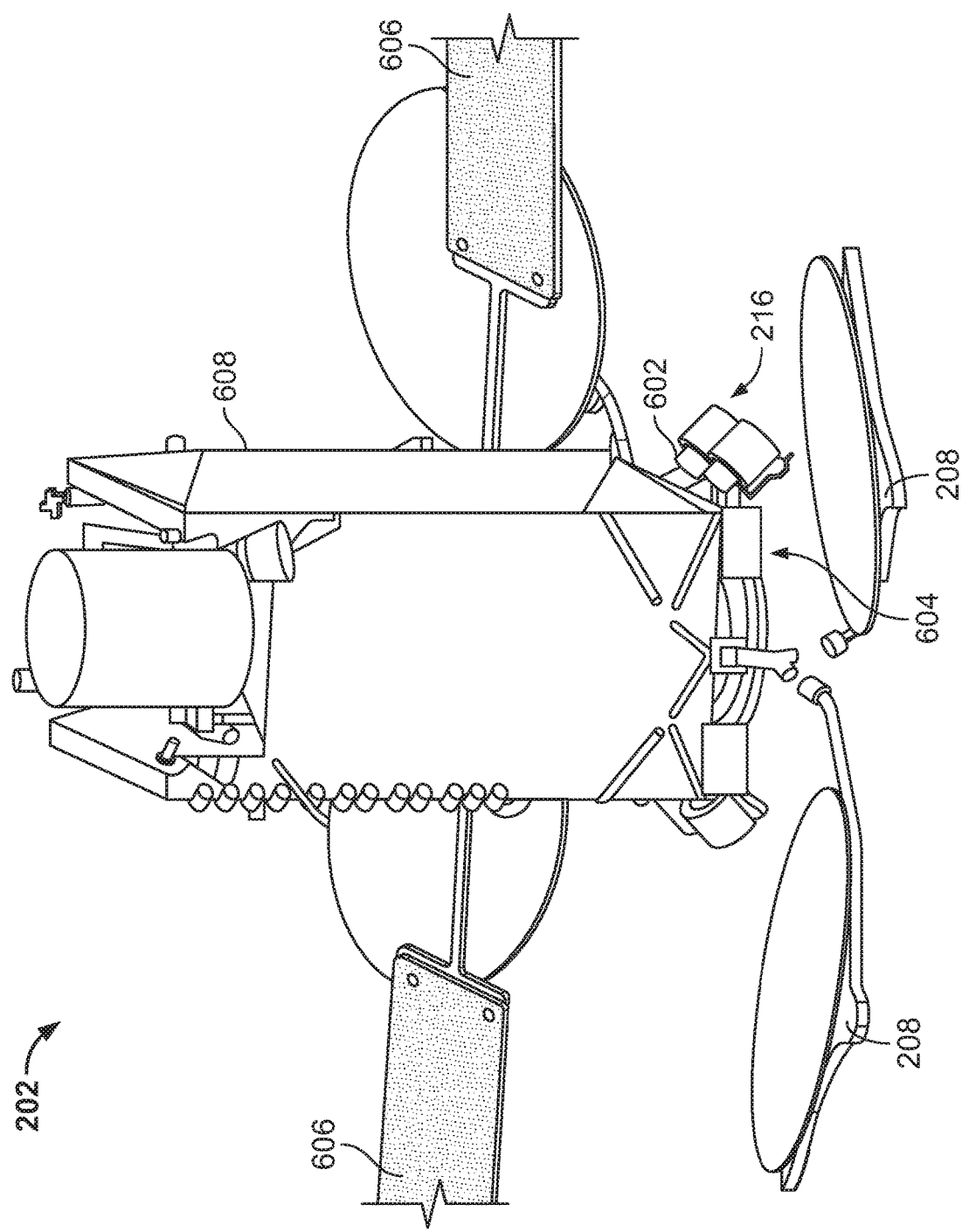
FIG. 6 depicts another one of the spacecrafts and/or modules of FIG. 2 in a deployed configuration.

FIG. 6 depicts the first spacecraft 202 in the deployed configuration. The first spacecraft 202 includes the thrusters 216 that are pivotably mounted to supports 602. In some examples, the propulsion system 214 and/or the thrusters 216 include Xenon ion propulsion (XIP) thrusters, power controllers, tankage, flow control and cross-strapping units. In some examples, the first spacecraft 202 also includes an electronics module, an attitude control system, and a battery and power controller 604. The first spacecraft 202 may also include the antennas 208, solar panels and/or arrays 606 and thermal radiators and equipment panels 608. While the above examples describe the first spacecraft 202 as including particular elements and/or a particular number of those elements, the first spacecraft 202 may include different and/or different quantities of elements.

Figure 7:
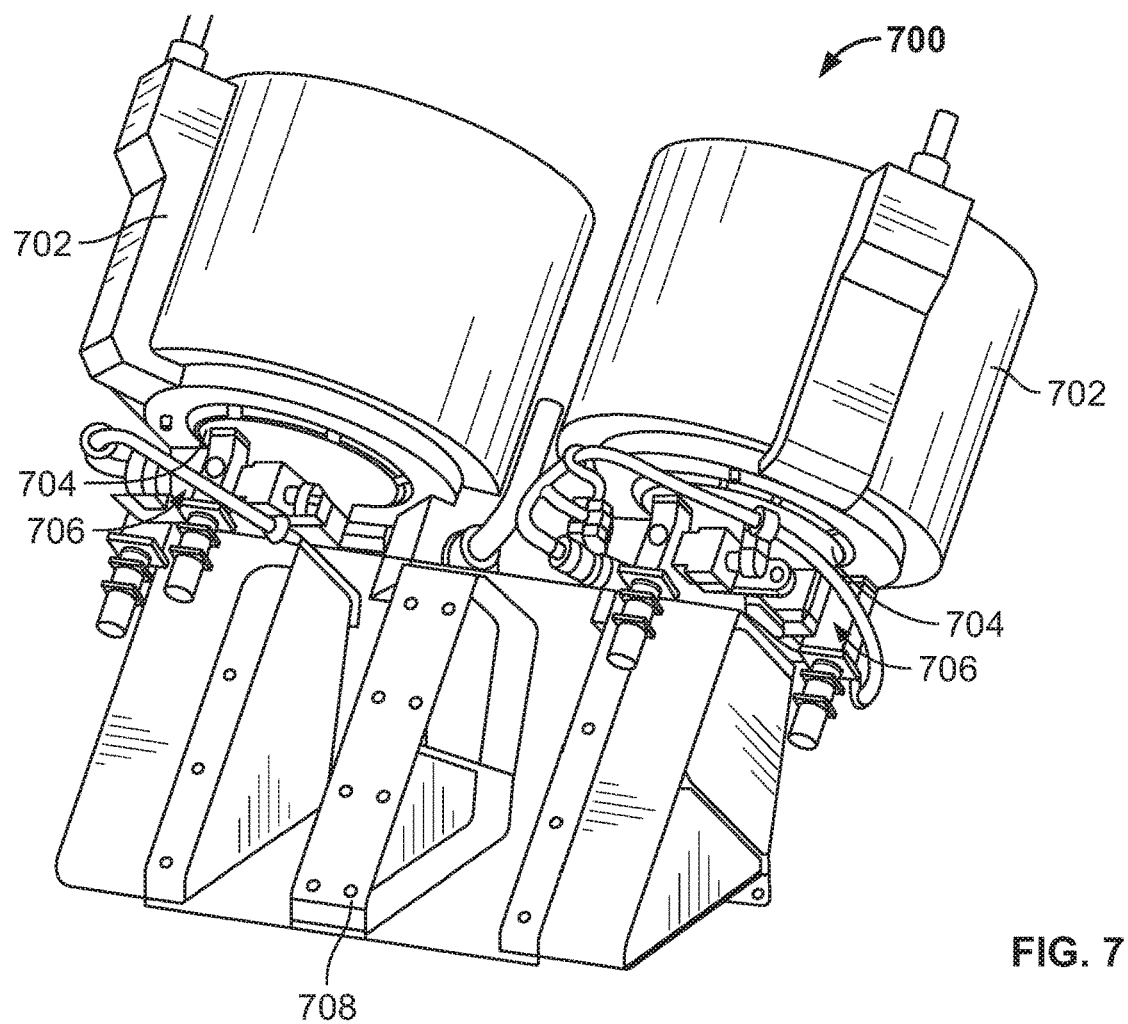
FIG. 7 depicts a portion of an example propulsion unit in accordance with the teachings of this disclosure.

FIG. 7 depicts a portion 700 of an example propulsion unit that can be used to implement the examples disclosed herein. The propulsion unit includes Xenon ion propulsion thrusters 702, adapters 704, gimbaled platforms 706 and a support structure 708. In operation, the gimbaled platforms 706 enable the thrusters 702 to be independently rotated and/or positioned to enable the thrusters 706 to move, thrust and/or rotate the respective spacecrafts 202, 204, once deployed from the launch vehicle 200.

Figure 8:
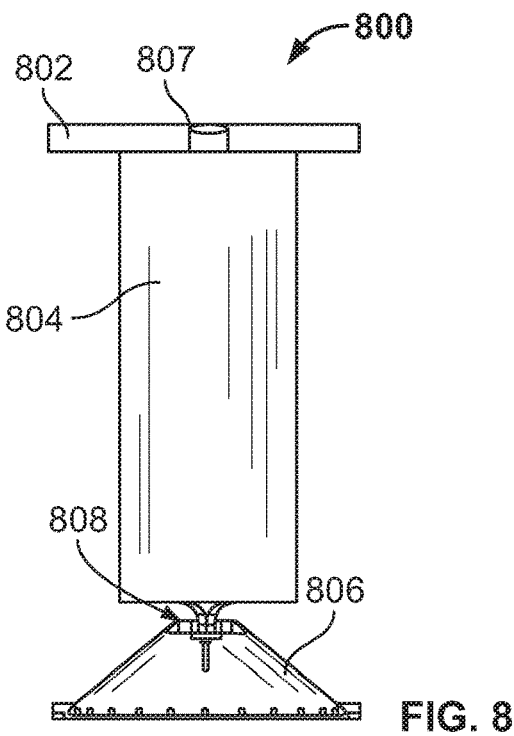
FIGS. 8 and 9 depict an example tank assembly in accordance with the teachings of this disclosure.
Figure 9:
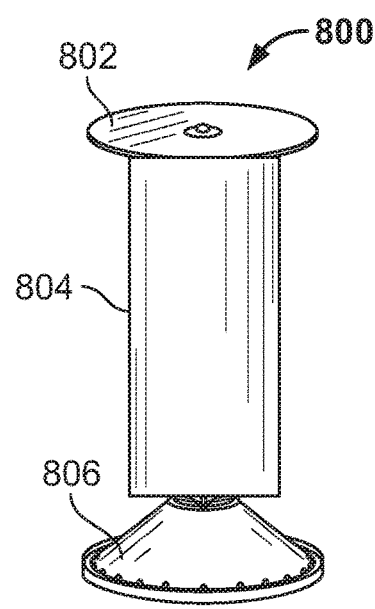

FIGS. 8 and 9 depict an example tank assembly 800 that can be used to implement the examples disclosed herein. The assembly 800 includes a tank support panel 802, a tank 804 and a conical support structure 806. In some examples, an axial slip joint and/or monoball 807 couples the tank support panel 802 to the tank 804 to enable the tank to expand and/or contract. In some examples, a moment free monoball mount 808 couples the tank 804 and the support structure 806.

Figure 10:
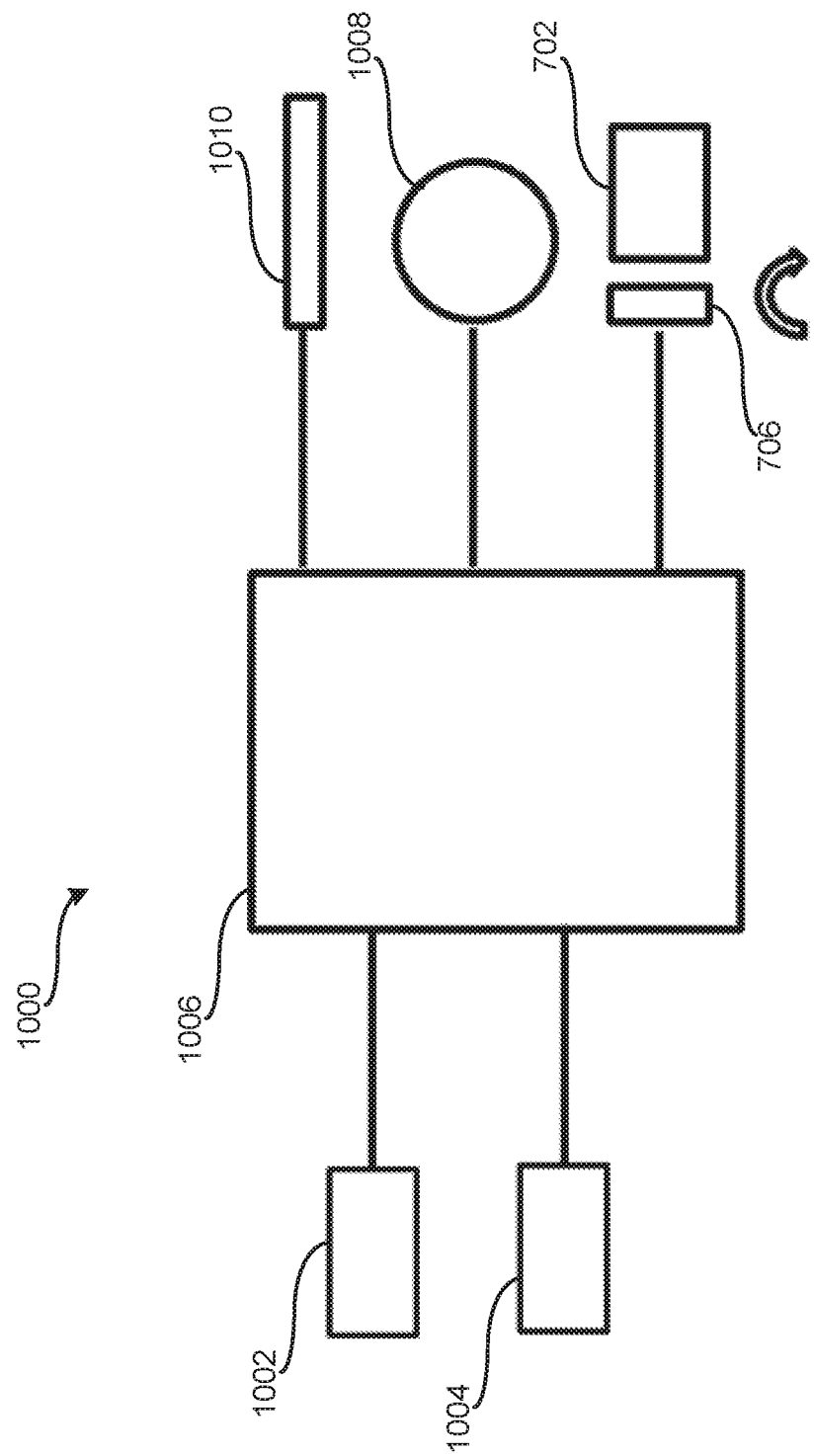
FIG. 10 depicts an example attitude control system in accordance with the teachings of this disclosure.

FIG. 10 depicts an example spacecraft attitude control system 1000 that together with a propulsion system may be used to implement the substantially all electric propulsion system. The attitude control system 1000 includes attitude sensors 1002 (e.g. earth sensors, sun sensors, star trackers), inertial rate sensors 1004, a controller 1006 and actuators. The actuators may include momentum storage devices 1008 (e.g. momentum wheels, reaction wheels), magnetic torquers 1010, and the propulsion unit including the thruster 702. The thruster 702 may be attached to the gimbal 706. Other examples may include alternate attitude sensing and control apparatus and/or methods.

In some examples, the attitude control system 1000 may be used for attitude and momentum control, etc. In this example, momentum is exchanged between the body (e.g., the spacecraft body) and the wheels (e.g., stored in the wheels) to control the attitude and rate of the body to point the body in the desired direction. The desired direction may be achieved by sensing the current attitude via sensors 1002 and rates via the inertial rate sensors 1004 and the controller 1006 applying torque to the momentum storage devices 1004 to create the desired pointing direction and rates. The desired direction may be such that the linear acceleration created by the thruster 702 will create the orbital changes requested and/or required (e.g. orbit raising). The control system 1000 may also point the body in a desired direction for the payload. In some examples, when orbital operations are requested and/or required concurrently with payload operations, the position and orientation of the thrusters 702 are chosen such that velocity vectors produced by the thrusters when the body is in the desired payload pointing attitude (e.g. earth pointed), can be combined to create the requested and/or required orbital changes. In some examples, the gimbal 706 is used to position the thrust vector nominally through the spacecraft center of mass. Alternatively, several thrusters may be gimbaled to an appropriate position and fired simultaneously such that net torques of all thrusters is zero.

Momentum created by external torques may be periodically 'dumped' from the wheels with the propulsion system by using the gimbal 706 to rotate the thrusters 702 away from the center of mass to achieve the desired torque and/or interaction with solar torques, the earth's magnetic field via magnetic torquers 1010, etc. In some examples, the example thruster 702 and the gimbal 706 arrangement uses the same set of thrusters in different orientations depending on the requested and/or required direction of acceleration and payload pointing. Other examples may include additional thrusters with little or no gimbal capability dedicated to creating acceleration in primarily a single direction. Other control systems may use the thruster 702 to create the desired spacecraft rate and pointing ('thrust vector steered') rather than rate and pointing through exchange of momentum. Other examples of the attitude control system 1002 may be an electrical, mechanical and/or magnetic system and/or any other suitable system.

As disclosed herein, the example electric propulsion system may use and/or be associated with ionized gas expulsion, non-ionized gas expulsion and/or cold gas states. For example, the example electric propulsion system may be used to propel the apparatus in either an ionized state and/or a non-ionized state of the species. In examples in which the electric prolusion system uses non-ionized gas, the gas may be discharged and/or dribbled out of the thrusters and/or the apparatus may include one or more cold gas thrusters. The cold gas thrusters may be used for occasional control and/or contingency operations of the apparatus.

In some examples, the non-ionized gas and/or the cold gas thrusters may be used in association with de-orbit operations and/or other phases of a mission. For example, the cold gas thrusters may use propellant from, for example, the tank 402 and/or the 404 and/or another gas tank (e.g., xenon tank) and feed system and/or another cold gas type.

As set forth herein, an example apparatus includes a frame a power source coupled to the frame and a payload coupled to the frame. The payload is to receive or transmit data. The apparatus includes an electric propulsion system coupled to the frame. The electric propulsion system is to enable attitude control, momentum control, and orbit control of the apparatus. In some examples, orbit control includes orbit maintaining, orbit changing, orbit raising, orbit insertion, orbit re-positioning, and de-orbit maneuvers of the apparatus. In some examples, momentum control includes momentum management. In some examples, the apparatus also includes a controller to control the electric propulsion system. In some examples, the apparatus also includes the electric propulsion system includes a thruster. In some examples, the electric propulsion system includes a gimbaled platform to enable the thruster to move relative to the frame. In some examples, the electric propulsion system includes a plurality of thrusters. In some examples, each of the thrusters is independently movable. In some examples, the electric propulsion system includes a tank to receive propellant. In some examples, the tank is positioned along a longitudinal axis of the frame. In some examples, the power source includes a solar array fixed or movable between a stowed configuration and a deployed configuration. In some examples, the payload is at least partly movable between a stowed configuration and a deployed configuration. In some examples, in a stowed configuration, the apparatus is to be positioned in a launch vehicle. In some examples, the electric propulsion system includes a Xenon ion propulsion system, a plasma propulsion system such as a stationary plasma thruster, or a Hall Effect propulsion system.

Another example apparatus includes a launch vehicle and a spacecraft to be positioned in the launch vehicle. The spacecraft includes a frame, a power source coupled to the frame and a payload coupled to the frame. The payload to receive or transmit data. An electric propulsion system is coupled to the frame to enable substantially all propulsion operations to be performed without another propulsion system. In some examples, the electric propulsion system includes a thruster and a gimbaled platform. The gimbaled platform is to enable the thruster to move relative to the frame. In some examples, the electric propulsion system includes a plurality of thrusters. In some examples the electric propulsion system includes a tank to receive propellant. In some examples, the tank is positioned along a longitudinal axis of the frame. In some examples, substantially all propulsion operations include attitude control, momentum control, and orbit control of the apparatus. In some examples, orbit control includes orbit maintaining, orbit changing, orbit raising, orbit insertion, orbit re-positioning, and de-orbit maneuvers of the spacecraft.

Another apparatus includes a launch vehicle, a first module and a second module. The first module is to be removably coupled to the second module. The first and second modules are to be positioned in the launch vehicle. The second module includes a frame, a power source coupled to the frame and a payload coupled to the frame. The payload is to receive or transmit data. The apparatus includes an electric propulsion system coupled to the frame. The electric propulsion system is to enable attitude control, momentum control, and orbit control of the second module. In some examples, the electric propulsion system includes a tank to receive propellant. In some examples, the tank is positioned along a longitudinal axis of the frame.

An example method to improve performance of a propulsion system includes using an electric propulsion system coupled to a frame and allowing the electric propulsion system to enable attitude control and orbit control. In some examples, using the electric propulsion system includes using a plurality of independently movable thrusters. In some examples, using the electric propulsion system includes using a propellant stored in a tank positioned along a longitudinal axis of the frame. In some examples, the method also includes allowing the electric propulsion system or an attitude control system to enable momentum control. In some examples, using the electric propulsion system comprises using a Xenon ion propulsion system, a plasma propulsion system such as a stationary plasma thruster, or a Hall Effect propulsion system.

The examples disclosed herein relate to a multiple space vehicle launch system that may include a first space vehicle, a second space vehicle releasably attached to the first space vehicle and oriented relative to the first space vehicle such that, when placed within a fairing, a launch load from the first space vehicle is transmitted to and borne by the second space vehicle, thereby eliminating the need for Sylda or other reinforcing or support structure. In an example, the first and second space vehicles each may include one of an electrical propulsion motor and a hybrid chemical and electrical propulsion motor. By utilizing electrical propulsion motors in the space vehicles, the total mass of the space vehicle may be significantly reduced when compared to a space vehicle having a chemical propulsion motor, which may enable support structures such as Sylda to be eliminated.

According to an example, a multiple space vehicle launch system may include a first space vehicle, a second space vehicle releasably attached to the first space vehicle and oriented relative to the first space vehicle such that when placed within a fairing, a launch load from the first space vehicle is transmitted to and borne by the second space vehicle. The first and second space vehicles each may include one of an electrical propulsion unit and a hybrid chemical and electrical propulsion unit.

In another example, a spacecraft launch system may include a launch vehicle with a fairing having a payload region, and a plurality of space vehicles disposed within the payload region. The plurality of space vehicles may be oriented in a vertically stacked manner such that at least a portion of gravitational and launch loads of an upper space vehicle are transmitted to and borne by a lower space vehicle. Each of the space vehicles may include at least one of an electrical propulsion unit and a hybrid electrical and chemical propulsion unit.

In yet another example, a method of launching a plurality of space vehicles may include providing a plurality of space vehicles, each of the plurality of space vehicles including at least one of an electrical propulsion unit and a hybrid electrical and chemical propulsion unit, orienting the plurality of space vehicles in a stacked manner within a payload region of a fairing of a launch vehicle such that gravitational and launch loads of an upper one of the plurality of space vehicles is transmitted to and borne by a lower one of the plurality of space vehicles, and launching the launch vehicle with the plurality of space vehicles.

In the examples described above and others, the use of traditional inter-launch vehicle fairing, Sylda, and inter-fairing separation systems may be eliminated. This reduces the non-revenue generating payload mass and may reserve more available mass for revenue generating payload.

Figure 11:
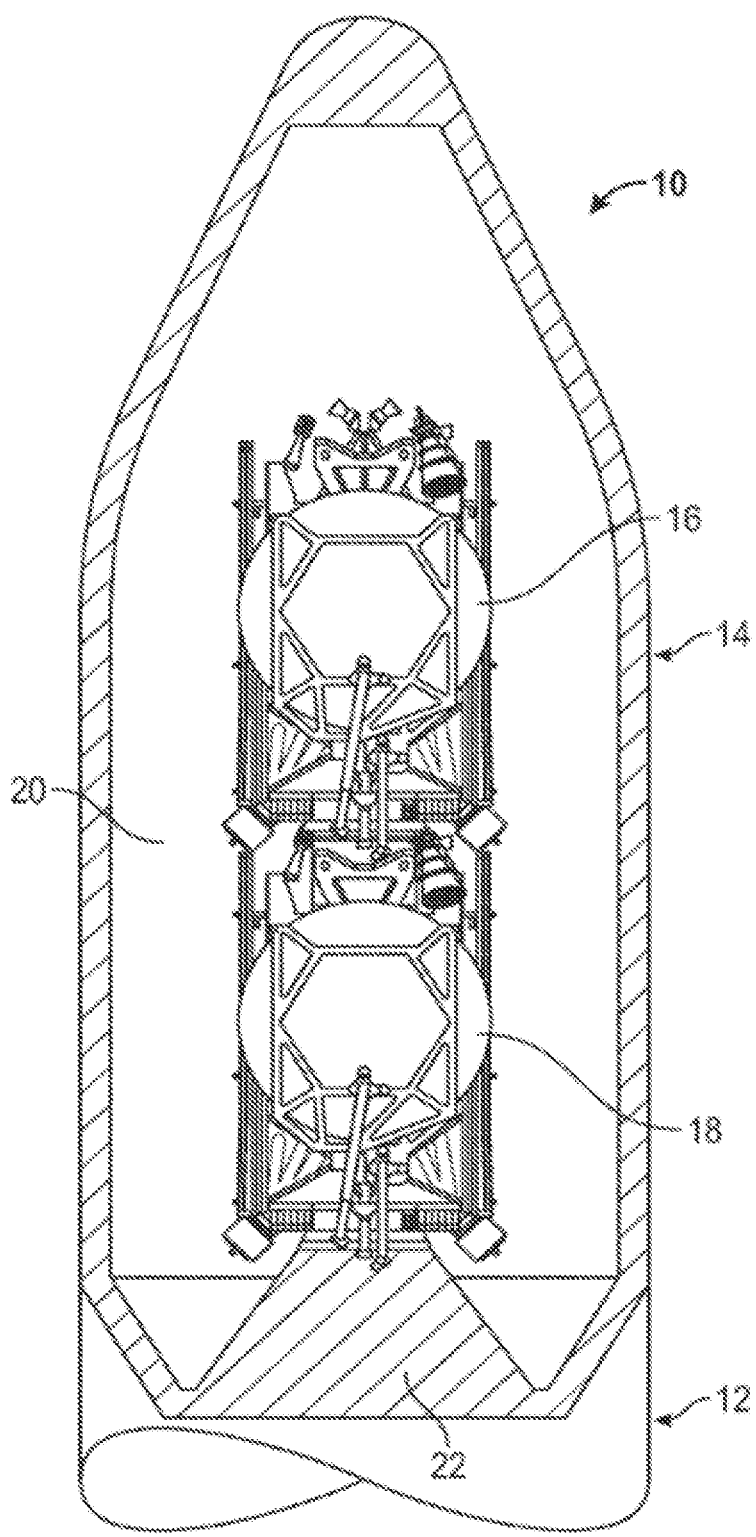
FIG. 11 is a schematic, side elevation in section of an example of the multiple space vehicle launch system of the present disclosure.

As shown in FIG. 11, an example multiple space vehicle launch system, generally designated 10, is used with a launch vehicle 12 having a fairing 14. The system 10 may include a first or upper space vehicle, generally designated 16, and a second or lower space vehicle, generally designated 18. The space vehicles are positioned within a payload region 20 of the fairing 14. It should be noted that, although FIG. 11 shows a space vehicle launch system 10 having two space vehicles 16, 18, it is within the scope of the disclosure to provide a space vehicle launch system having three or more space vehicles.

Regardless of the number of space vehicles 16, 18 employed in the launch system, the arrangement of space vehicles within the fairing 14 may be in a stacked, vertical configuration as shown in FIG. 11. The term "vertical" as used herein refers to the orientation of the stacked space vehicles 16, 18 relative to a launch pad supporting the launch vehicle 12 when the launch vehicle is oriented in a vertical position, or a vertically stacked manner, relative to the Earth. In an example, the stacked space vehicles 16, 18 may be aligned with, and may coincide with, a central longitudinal axis of the fairing 14 and/or launch vehicle 12. The lower space vehicle 18 may rest upon a base 22 that may be a part of the fairing 14.

Figure 12:
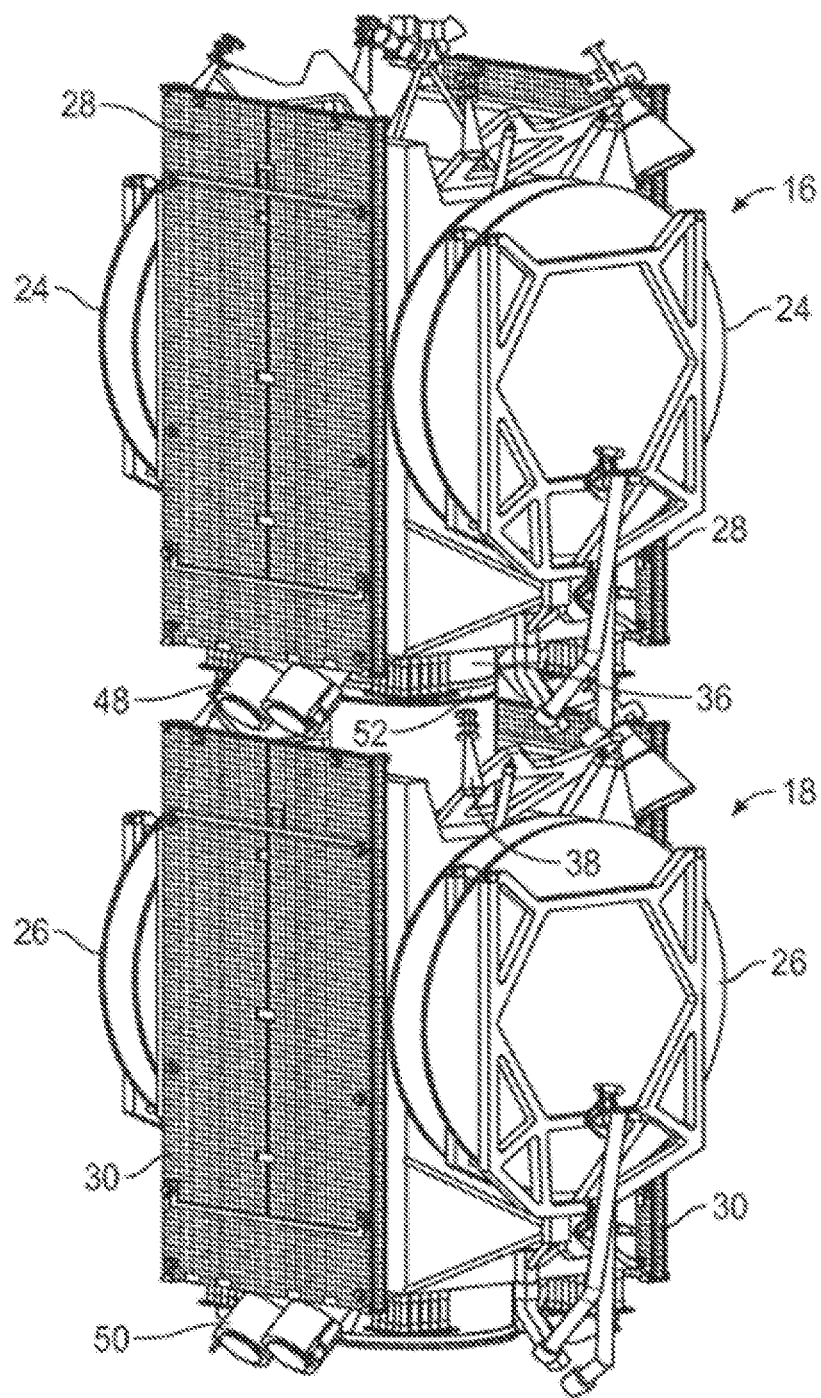
FIG. 12 is a schematic, perspective view of two space vehicles depicted in FIG. 11.
Figure 13:
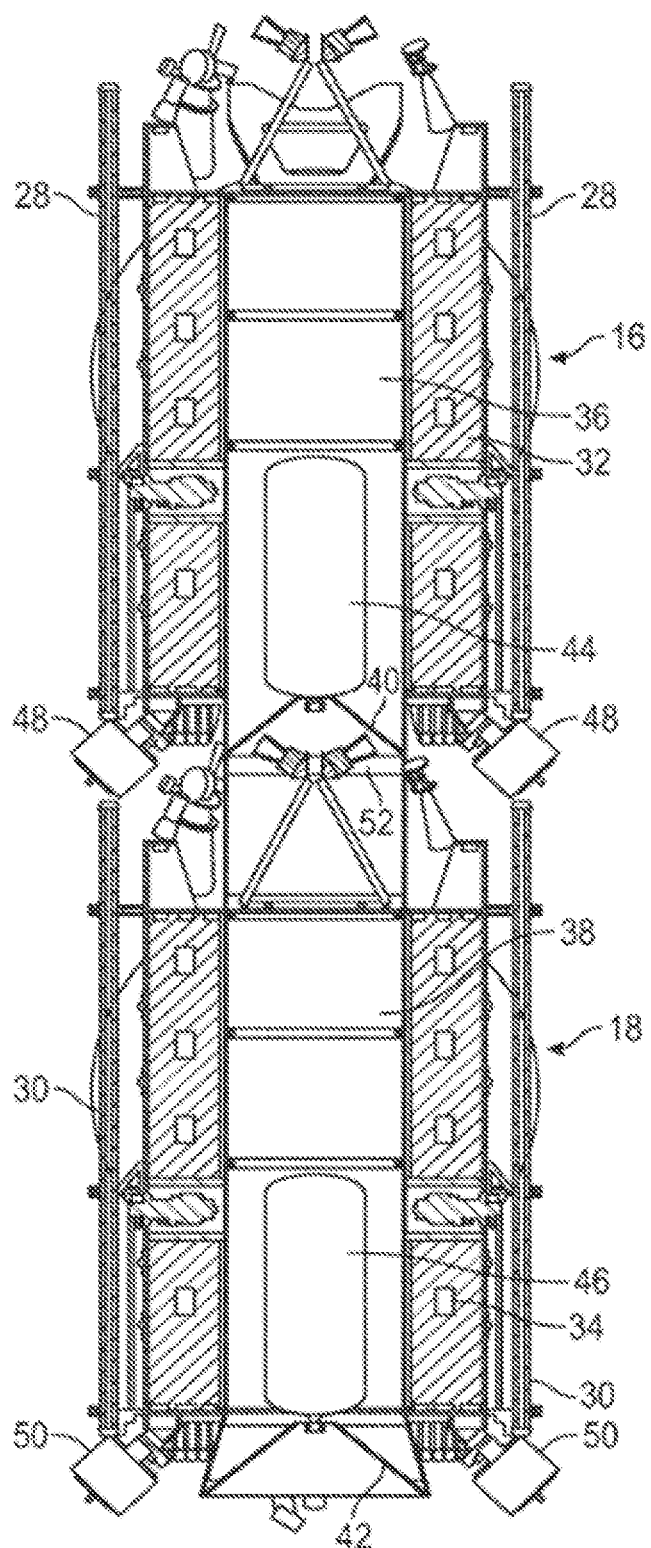
FIG. 13 is a schematic, side elevation in section of the space vehicles depicted in FIG. 11.

As shown in FIGS. 12 and 13, the space vehicles 16, 18 may be satellites. In various examples, the space vehicles 16, 18 may be geosynchronous satellites, interplanetary probes, combinations thereof, or any type of space vehicle having a propulsion system that is launched by a launch vehicle 12 (FIG. 11).

The space vehicles 16, 18 may include antenna reflectors 24, 26, respectively, and deployable solar arrays 28, 30, respectively. As best shown in FIG. 13, the space vehicles 16, 18 may include shear load panels 32, 34 that are mounted on core structure 36, 38, respectively.

The core structures 36, 38 may be cylindrical in shape and hollow. Core structures may be of other shapes and not depart from the scope of this disclosure. Core structure 36 may be made of a strong, light material such as graphite, and in one example have a wall thickness of 0.09". Core structure 38 also may be made of a strong, light material such as graphite, and in one example have a wall thickness of 0.45". The shear panels 32, 34 may support the solar arrays 28, 30 of the space vehicles 16, 18, respectively.

In the example shown in FIGS. 12 and 13, the space vehicles 16, 18 each may include an electric propulsion motor, generally designated 40, 42, respectively. Electric propulsion motors 40, 42 may include an ion/plasma motor that utilizes Xenon gas as a propellant that is stored in tanks 44, 46 that may be positioned within core structure 36, 38, respectively. The electric propulsion motors 40, 42 also may include exhaust nozzles 48, 50, respectively.

In the examples shown in FIGS. 12 and 13, the space vehicles 16, 18 each may include a single electric propulsion motor 40, 42 that may constitute the sole source of propulsion and navigation for that space vehicle; no other propulsion source may be included. The components 40, 42 of space vehicles 16, 18 also may represent other types of electric propulsion motors, as well as hybrid electric/chemical propulsion motors. It is also within the scope of the disclosure to provide space vehicle 16 with an electric propulsion motor 40 and provide space vehicle 18 with a hybrid electric/chemical propulsion motor 42. Use of electric propulsion motors 40, 42, or hybrid electric/chemical propulsion motors may be advantageous because they reduce the overall mass of the space vehicles 16, 18 in comparison to chemical propulsion motors.

In one example, the upper space vehicle 16 may be connected to the lower space vehicle 18 by a pre-tensioned release band 52 that connects the core structure 36 of the upper vehicle with the core structure 38 of the lower vehicle. As shown in the figures, the core structure 38 of the lower vehicle 18 may extend upwardly above the upper edge of the solar arrays 30 of the lower vehicle to engage the core structure 36 which, in the example shown, may not extend beyond the lower edge of the solar arrays 28 of the upper space vehicle.

Figure 14:
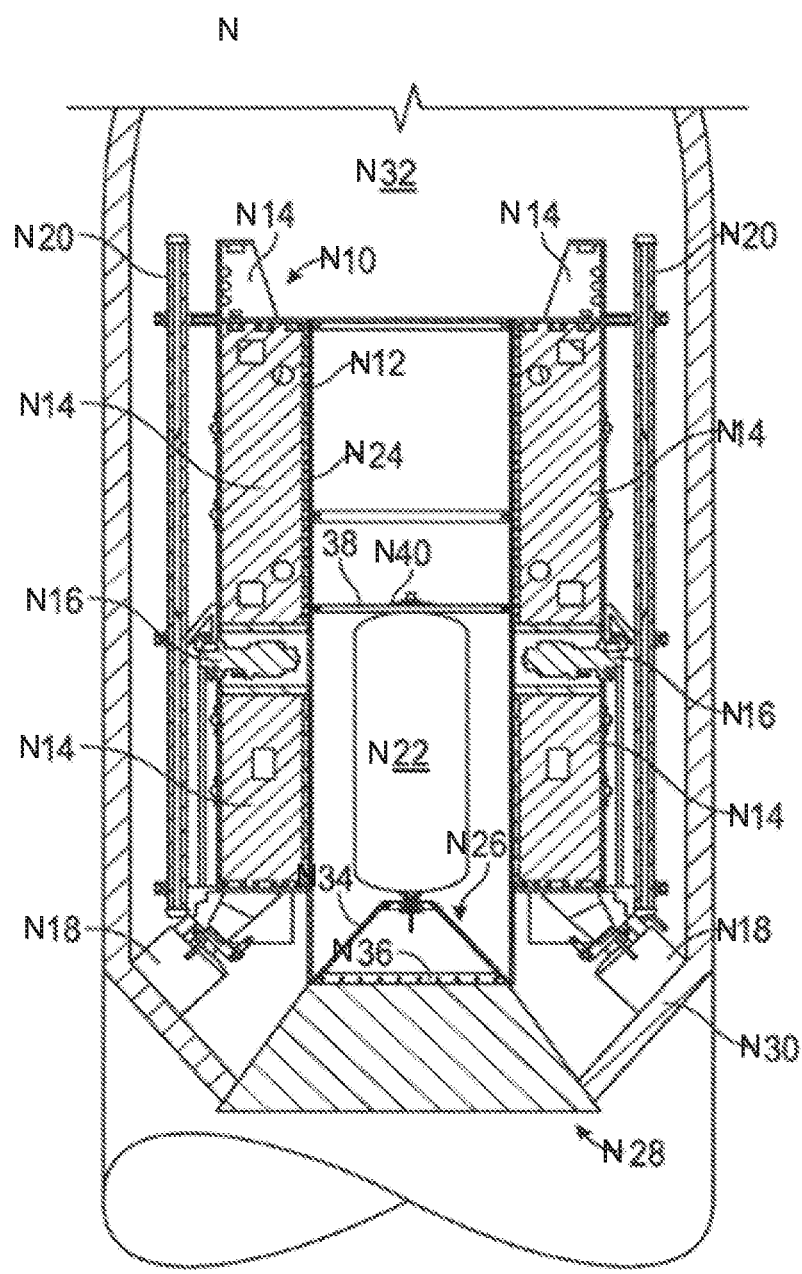
FIG. 14 is a side elevation in section of an example of a spacecraft incorporating the disclosed tank mount, shown mounted in a launch vehicle fairing.

In operation, the upper and lower space vehicles 16, 18, respectively, first may be attached to each other by the pre-tensioned release band 52. The combined space vehicles 16, 18 may be placed within the fairing 14 of a launch vehicle 12, as shown in FIG. 14, so that the lower space vehicle rests upon the base 22 of the fairing.

When the launch vehicle is standing on the launch pad, the launch vehicle 12, fairing 14 and space vehicles 16, 18 may be oriented vertically relative to the Earth. In this configuration, the downward gravitational force of the upper space vehicle 16 may be transmitted to and borne entirely by the lower space vehicle 18. In the example shown, this gravitational force may be transmitted entirely from the core structure 36 of the upper space vehicle 16 to the core structure 38 of the lower space vehicle 18.

During liftoff of the launch vehicle 12, the acceleration forces of the upper space vehicle 16 likewise may be transmitted through the core structure 36 to the core structure 38 of the lower space vehicle 18. In the example shown, the upper and lower space vehicles 16, 18 may be linearly and vertically aligned in a vertically stacked configuration so that the gravitational and launch loads of the upper space vehicle 16 are efficiently transmitted to and borne entirely by the lower space vehicle 18.

In conclusion, two configuration features of the disclosed space vehicle launch system combine to provide a reduction in overall launch system mass. First, the individual space vehicles do not use conventional chemical propellant, but instead use electric propulsion, in one example, which has a higher efficiency and thus requires significantly less propellant mass. In another example, the space vehicles may use a hybrid electric/chemical propulsion motor. Second, the space vehicles may be stacked, one on top of the other, so that the launch loads from the upper space vehicle may pass through the lower space vehicle.

The upper and lower space vehicles may include a compatible mounting structure for releasably mounting adjacent spacecraft. This structure may eliminate the need for an inner fairing structure or a fairing separation system, which otherwise might be necessary for multiply manifested spacecraft. The disclosed vehicle launch system may eliminate a significant amount of mass that is not required to fulfill the primary spacecraft mission, which allows more available mass for revenue-generating payload. Further, minimizing propellant mass and non-functional structure mass from the launch vehicle optimizes the overall system mass.

As set forth herein, an example multiple space vehicle launch system includes a first space vehicle, a second space vehicle releasably attached to the first space vehicle and oriented relative to the first space vehicle such that when placed within a fairing, a launch load from the first space vehicle is transmitted to and borne by the second space vehicle. The first and the second space vehicles each include one of an electrical propulsion unit and a hybrid chemical and electrical propulsion unit. In some examples, the first and the second space vehicles are oriented in a stacked configuration. In some examples, the first and the second space vehicles are oriented in a vertically stacked configuration during launch. In some examples, the example multiple space vehicle launch system also includes a fairing shaped to enclose the first and the second space vehicles.

In some examples, the fairing includes a base shaped to support the second space vehicle. In some examples, the second space vehicle is attached to the first space vehicle such that the launch load from the first space vehicle is transmitted entirely to, and borne entirely by, the second space vehicle. In some examples, the first space vehicle includes a first core structure. The second space vehicle includes a second core structure; and the first core structure is attached to the second core structure. In some examples, the launch load from the first space vehicle is transmitted to the second space vehicle through the first core structure and the second core structure. In some examples, the first and the second space vehicles each include an electrical propulsion unit. In some examples, the electrical propulsion unit is an ion/plasma propulsion unit. In some examples, the electrical propulsion unit includes Xenon gas. In some examples, at least one of the first and the second space vehicles is a satellite.

Another example spacecraft launch system includes a launch vehicle including a fairing having a payload region, a plurality of space vehicles disposed within the payload region. The plurality of space vehicles being oriented in a vertically stacked manner such that at least a portion of gravitational and launch loads of an upper space vehicle are transmitted to and borne by a lower space vehicle. Each of the space vehicles includes at least one of an electrical propulsion unit and a hybrid electrical and chemical propulsion unit. In some examples, at least one of the space vehicles is a satellite. In some examples, each of the space vehicles includes an electrical propulsion unit.

An example method of launching a plurality of space vehicles includes providing a plurality of space vehicles, each of the plurality of space vehicles including at least one of an electrical propulsion unit and a hybrid electrical and chemical propulsion unit, orienting the plurality of space vehicles in a stacked manner within a payload region of a fairing of a launch vehicle such that gravitational and launch loads of an upper one of the plurality of space vehicles is transmitted to and borne by a lower one of the plurality of space vehicles, and launching the launch vehicle with the plurality of space vehicles.

In some examples, providing a plurality of space vehicles includes providing at least one satellite. In some examples, providing a plurality of space vehicles includes providing a first space vehicle and providing a second space vehicle. In some examples, orienting the plurality of space vehicles includes attaching the first space vehicle to the second space vehicle such that a launch load of the first space vehicle is transmitted to and borne by the second space vehicle. In some examples, attaching the first space vehicle to the second space vehicle includes attaching a core structure of the first space vehicle to a core structure of the second space vehicle.

An example multiple space vehicle launch system that may be adapted to be disposed within a payload region of a launch vehicle fairing is disclosed. The launch system may include a first space vehicle, a second space vehicle releasably attached to the first space vehicle and oriented relative to the first space vehicle such that, when placed within the fairing, a launch load of the first space vehicle is transmitted to and borne by the second space vehicle. In certain examples, the first and second space vehicles each may include one of an electrical propulsion unit and a hybrid chemical and electrical propulsion unit. Use of electrical or hybrid chemical and electrical propulsion units enables the second space vehicle to bear all or a significant portion of the launch load of the first space vehicle, thereby eliminating the need for additional support structure.

The examples disclosed herein relate to a spacecraft having a primary structural frame and a propellant tank, the spacecraft including a tank mount adapted to engage a portion of the propellant tank, the tank mount being configured to transfer launch loads directly from the propellant tank to the launch vehicle interface ring. In one aspect, the propellant tank mount includes a conical shell having a first end adapted to engage an end of a propellant tank, and a second end adapted to engage a launch vehicle interface ring. In another aspect, a method of mounting a propellant tank to a spacecraft having a primary structural frame includes providing a tank support adapted to engage a portion of the propellant tank, the tank support being configured to transfer launch loads directly from a propellant tank to a launch vehicle interface ring.

In some examples of the disclosed spacecraft, propellant tank mount and method is that the propellant tank may be supported independently of the central thrust tube of the spacecraft. Consequently, the spacecraft and mount may accommodate propellant tanks of a variety of shapes and diameters. The shape and diameter of the propellant tank need not be dictated by the inside diameter of the central thrust tube. In some examples of the disclosed spacecraft, propellant tank mount and method is that the launch load of the propellant tank may be transferred directly from the propellant tank to the launch vehicle interface ring, and not borne by the central thrust tube of the spacecraft.

The disclosed design may provide a mass-efficient solution because the propellant tank load (i.e., the force exerted by the mass of the propellant tank during launch, and when the launch vehicle is accelerating, as a result of acceleration of the launch vehicle and spacecraft) may bypass the spacecraft's primary structure. This may enable use of a simplified and relatively lighter primary structure, so that a larger portion of the available mass of the spacecraft may be allotted to instrumentation and other spacecraft payload.

As shown in FIG. 14, the disclosed spacecraft, generally designated N10, may include a primary structural frame that may be in the form of a cylindrical central thrust tube N12 that extends substantially the entire length of the spacecraft. The thrust tube N12 also may support stiffener panels N14, solar wing drives N16 and thrusters N18. Thrusters N18 may be used for attitude control and/or moving the spacecraft N10 to a different orbit. The solar wing drives N16 may support solar panels N20.

The thrusters N18 may be include electric propulsion units connected to a propellant tank N22. In examples, the thrusters N18 may be gridded electrostatic ion thrusters, or Hall effect thrusters. The propellant tank N22 may contain xenon gas propellant under pressure and may be dimensioned to be spaced from the inner surface N24 of the central thrust tube N12. Although shown in FIG. 14 as having a cylindrical shape, in examples the propellant tank N22 may be spherical, elliptical or oval in shape, etc. In an example, the propellant tank N22 may be a metallic pressure vessel with a composite overwrap reinforcement. In examples, the propellant tank N22 may be made of aluminum or titanium, and may or may not have overwrap reinforcement.

Figure 16:
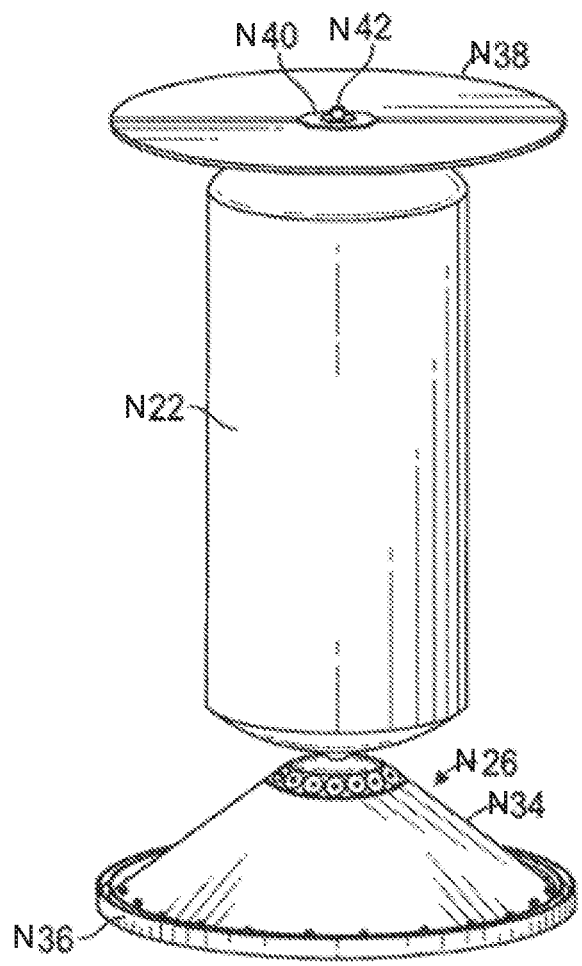
FIG. 16 is a perspective view of the disclosed tank support of FIG. 14.

As shown in FIGS. 14 and 16, the spacecraft N10 may include a tank mount, generally designated N26. The tank mount N26 may serve to attach the spacecraft N10 to the base N28 of a launch vehicle N30, so that the spacecraft N10 may be positioned within the payload region N32 of the launch vehicle. The tank mount N26 may include a conical shell N34 that may be made of a lightweight, strong composite material. In an example, the material may include graphite or carbon fiber and may have a honeycomb structure. In other examples, the conical shell N34 may be made of metal, such as titanium, steel or aluminum alloy. The conical shell N34 may be attached to a launch vehicle interface ring N36, which may be part of the base N28 of a launch vehicle N30.

At an opposite end of the propellant tank N22, the tank mount N26 may include a forward tank support panel N38. The forward tank support panel N38 may be disk-shaped and sized to engage the inner periphery N24 of the central thrust tube N12. The forward tank support panel N38 may be a solid disk, as shown, or may have voids to reduce weight. The forward tank support panel N38 may be attached to the propellant tank N22 by a pivotal mount N40, such as the monoball bearing axial slip joint shown. Other types of pivotal mounts may be employed. The forward tank support panel N38 may be attached to the inner periphery N24 of the central thrust tube N12 by welding, brazing, adhesives or other means.

Figure 17:
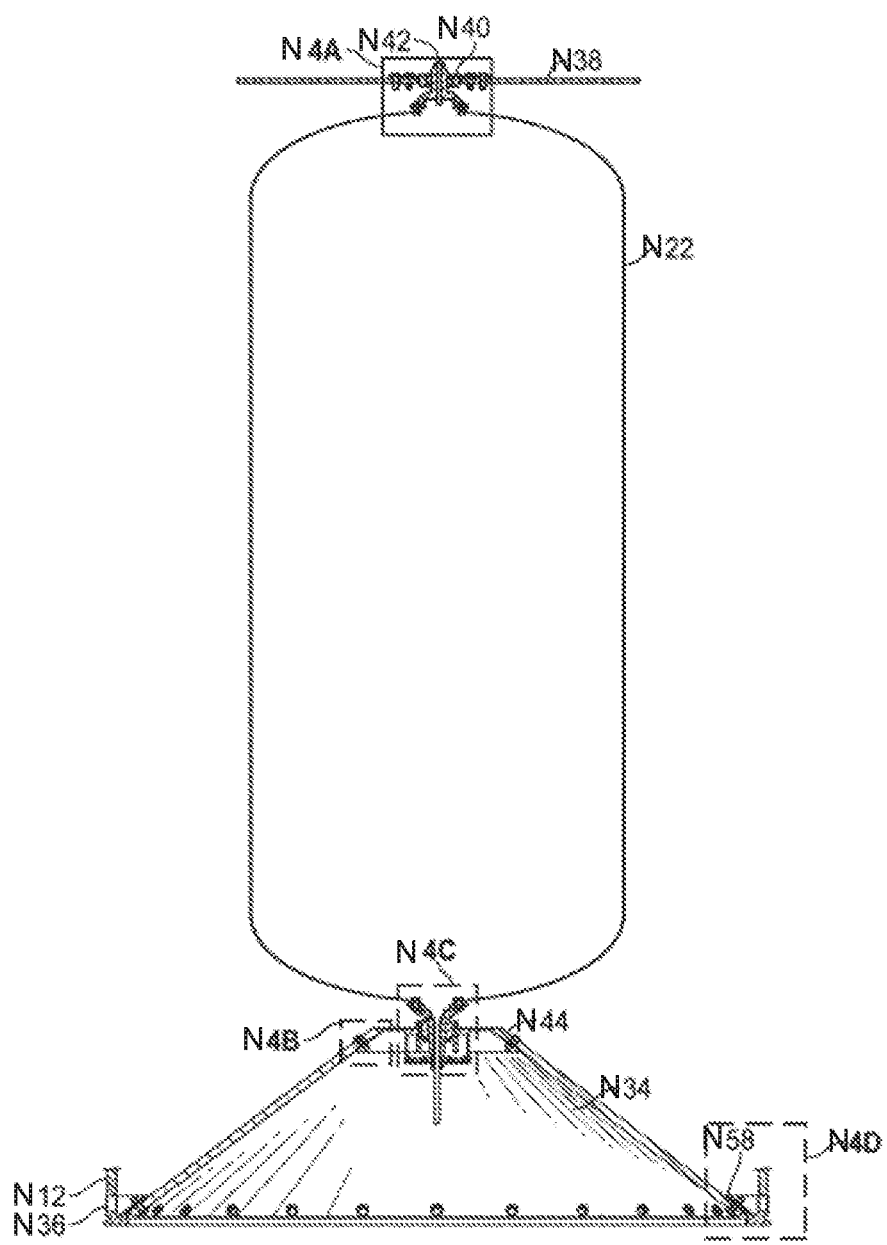
FIG. 17 is a side elevation in section of disclosed tank support structure of FIG. 14.
Figure 18:
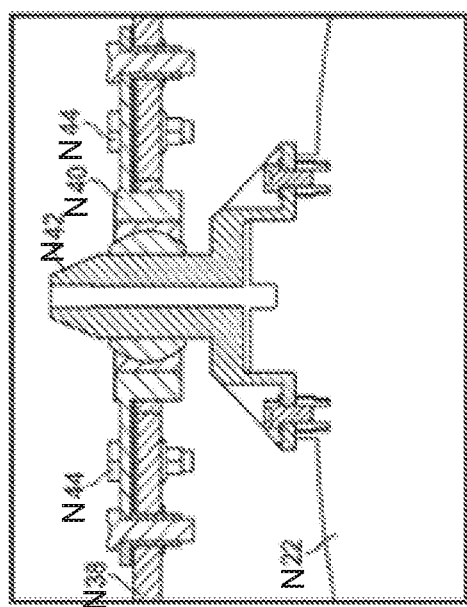

As shown in FIGS. 17 and 18, the propellant tank N22 may include an axially extending forward tank boss N42 that may extend through and is captured by the monoball bearing joint N40. The monoball bearing joint N40 may be attached to the forward tank support panel N38 by fasteners such as bolts N44. In other examples, the monoball bearing joint N40 may be attached to the forward tank support panel N38 by a suitable adhesive, by welding, by rivets, or a combination of the foregoing. The monoball bearing joint N40 may be made of metal, such as an aluminum alloy or titanium.

Figure 19:
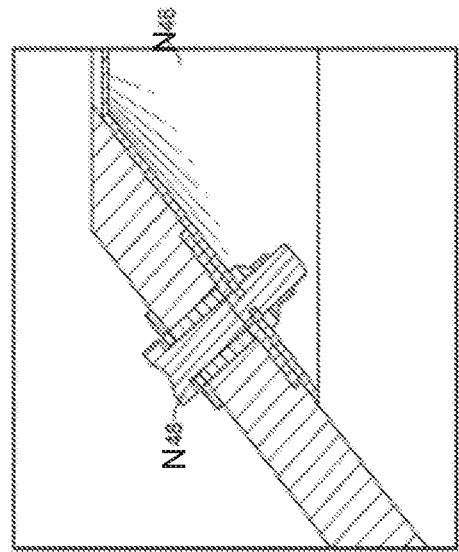
FIGS. 18, 19, 20, and 21 are enlarged detail views, in section, of portions of the tank support structure shown in FIG. 17.
Figure 20:
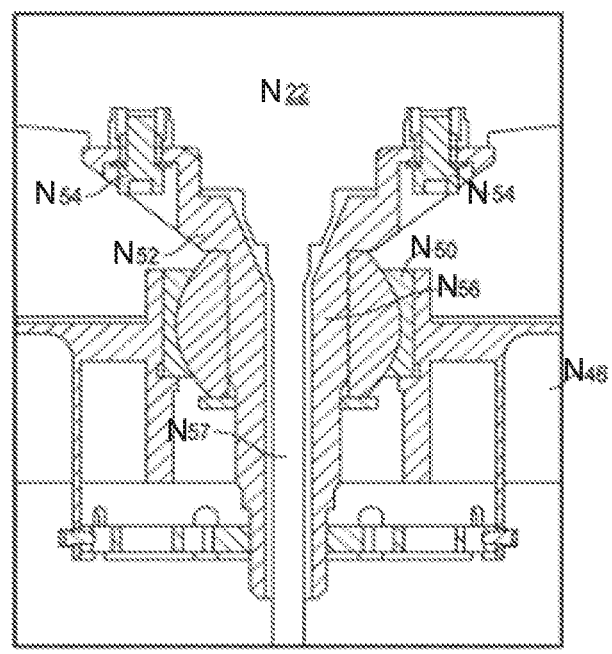

As shown in FIGS. 17 and 19, the upper end N44 of the conical shell N34 may be attached to a cap N46 that may be made of a hardened material such as titanium or other metal. The attaching mechanism may be by adhesives, or bolts N48 as shown in FIG. 19. As shown in FIGS. 17 and 20, the cap N46 may include a pivotal mount N50, such as the moment-free monoball bearing mount shown. Monoball bearing mount N50 may receive an aft tank boss N52 of the propellant tank N22. The aft tank boss N52 may be attached to the propellant tank by screws N54 and may include an adapter tube N56 that extends through and is captured by the monoball bearing mount N50. The tube N56 may be hollow and shaped to receive an outlet tube N57 of the propellant tank N22. In one example, the tube N56 may be slidable relative to the monoball bearing mount to allow for expansion and contraction of the propellant tank N22, and accommodate any out-of-tolerance conditions. Similarly, the forward tank boss 42 (FIG. 18) may be slidably retained by the monoball bearing slip joint N40. In examples, both joints N40 and N50 may allow axial (i.e., in the direction of the longitudinal axis of the spacecraft 10) and pivotal movement of the propellant tank N22 relative to the spacecraft N10, central thrust tube N12 and conical support N34.

Figure 21:
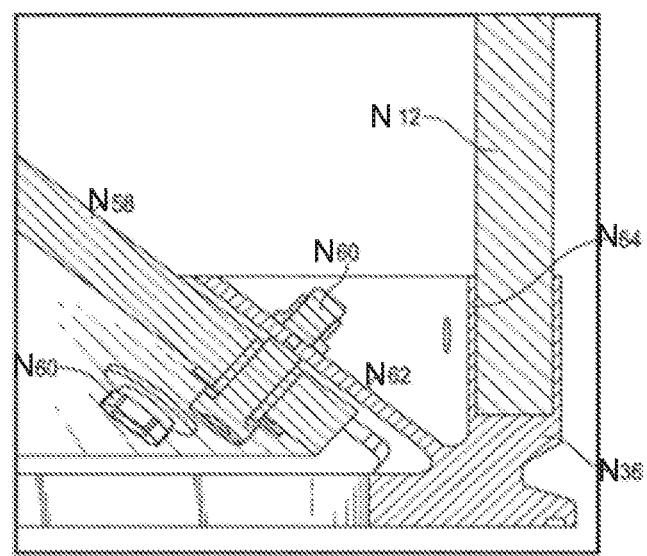

As shown in FIGS. 17 and 21, the lower end N58 of the conical shell N34 may be attached to the launch vehicle interface ring N36 by bolts N60 that extend through the lower end and through tabs N62 formed on the interface ring N36. As shown in FIG. 21, the interface ring N36 also may include an angular slot N64 shaped to receive the bottom of the central thrust tube N12 (FIG. 14), and the joint may be secured by means such as an adhesive, welding or brazing, mechanical fasteners such as screws, or a combination of the foregoing.

Figure 15:
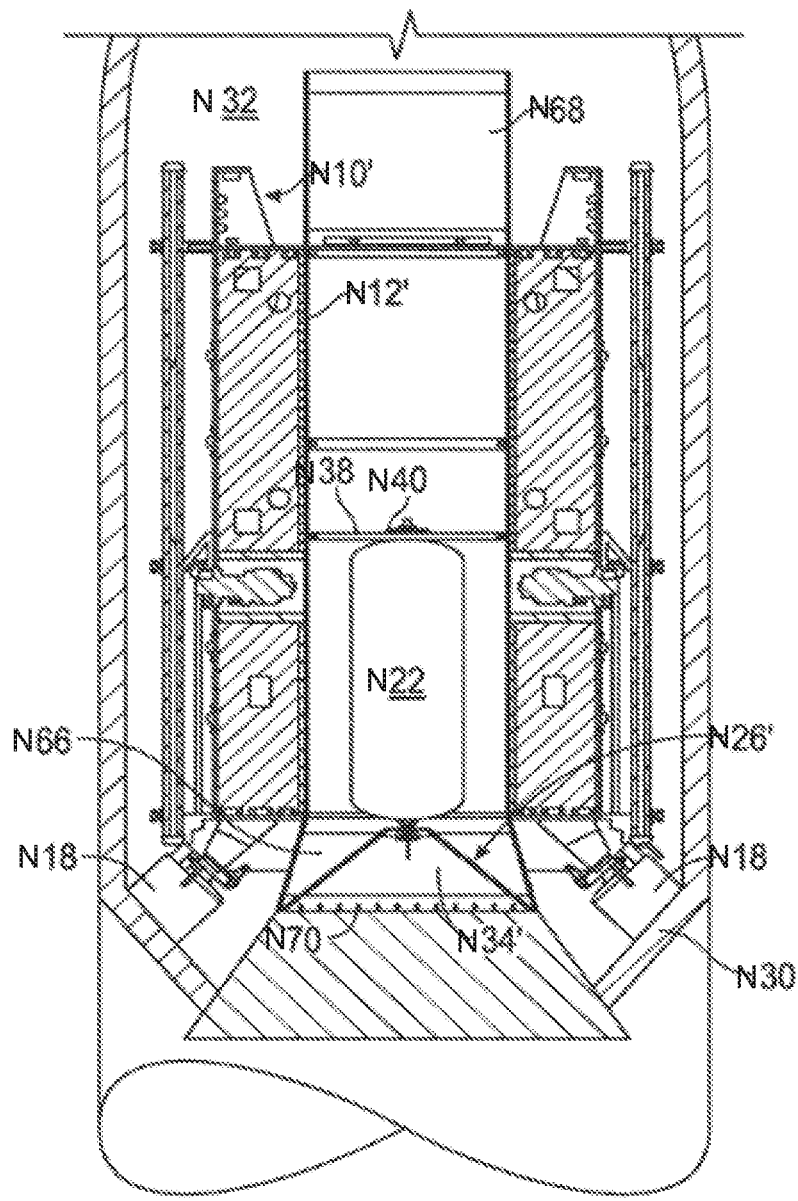
FIG. 15 is a side elevation in section of a second example of a spacecraft incorporating the disclosed tank mount, shown incorporated in a larger launch vehicle fairing.

As shown in FIG. 15, a spacecraft N10' may include a central thrust tube N12' that is flared outwardly at the bottom of N66 to accommodate a greater thrust load, in the event that the central thrust tube N12' may support the thrust tube N68 of a second spacecraft to be launched in tandem with the spacecraft N10. In this example, the propellant tank N22 may be supported in a similar fashion as that described with reference to FIG. 14, except that the conical shell N34' may be shaped to flare outwardly at a greater angle than shell N34 engage a larger interface ring N70.

The disclosed spacecraft N10, N10' and tank mount N26, N26' provide a low-cost mounting system that may transfer launch loads from the lower propellant tank nozzle N52 through the conical shell N34 and to the launch vehicle interface ring N36. Therefore, the launch load of the propellant tank N22 may be conveyed directly to the interface ring 36 without transferring a load to the central thrust tube N12. Because the connection between the propellant tank N22 and the forward tank support panel 38 is by way of a slip joint N40, there is not thrust load transmitted to the central thrust tube N12 at that location. Thus, the entire thrust load of the propellant tank may be borne by the interface ring N36 and not the structural frame of the spacecraft N12, N12'. Further, because the propellant tank is attached to the spacecraft N12, N12' at its upper and lower ends by boss N42 and nozzle N56, the support system will accommodate a variety of propellant tank dimensions and diameters.

As set forth herein, an example spacecraft having a primary structural frame and a propellant tank includes a tank mount adapted to engage a portion of the propellant tank. The tank mount being configured to transfer launch loads directly from the propellant tank to a launch vehicle interface ring. In some examples, the tank mount is conical in shape. In some examples, the tank mount includes a conical shell. In some examples, the tank mount includes a pivotal mount attached to the propellant tank and the conical shell. In some examples, the pivotal mount includes a monoball bearing mount.

In some examples, the conical shell is formed of a composite material. In some examples, the conical shell if formed of one or more of graphite, carbon fiber, titanium, steel and aluminum alloy. In some examples, the conical shell has a honeycomb structure. In some examples, the conical shell includes a lower peripheral edge shaped to engage the launch vehicle interface ring. In some examples, the lower peripheral edge is mechanically attached to the launch vehicle interface ring. In some examples, the tank mount includes a plurality of bolts mechanically attaching the lower peripheral edge to the launch vehicle interface ring.

In some examples, the propellant tank is generally one of spherical, elliptical, cylindrical and oval in shape. In some examples, the propellant tank is configured to retain xenon gas propellant. In some examples, the primary structural frame includes a cylindrical central thrust tube, and the propellant tank is shaped to fit within and not contact the cylindrical central thrust tube directly. In some examples, example spacecraft includes a forward tank support panel for supporting an end of the propellant tank opposite the tank support, the forward tank support panel being shaped to engage the primary structural frame. In some examples, the forward tank support panel includes a pivotal mount attached to the propellant tank. In some examples, the pivotal mount includes a monoball bearing. In some examples, the propellant tank includes axially extending forward tank boss, and the monoball bearing is shaped to receive the forward tank boss for relative slidable and pivotal movement.

An example propellant tank mount for a spacecraft includes a conical shell having a first end adapted to engage an end of a propellant tank, and a second end adapted to engage a launch vehicle interface ring.

An example method of mounting a propellant tank to a spacecraft having a primary structural frame includes providing a tank support adapted to engage a portion of the propellant tank, the tank support being configured to transfer launch loads directly from the propellant tank to a launch vehicle interface ring.

A spacecraft having a primary structural frame and a propellant tank, in which the spacecraft may include a tank mount adopted to engage a portion of the propellant tank, the tank mount being configured to transfer launch loads directly from the propellant tank to a lunch vehicle interface ring.

As set forth herein, an example apparatus includes a frame; a power source coupled to the frame; a payload coupled to the frame, the payload to receive or transmit data; and an electric propulsion system coupled to the frame, the electric propulsion system to enable attitude control, momentum control, and orbit control of the apparatus.

In some examples, the orbit control includes orbit maintaining, orbit changing, orbit raising, orbit insertion, orbit re-positioning, and de-orbit maneuvers of the apparatus and wherein momentum control comprises momentum management. In some examples, the apparatus includes a controller to control the electric propulsion system. In some examples, the electric propulsion system includes a thruster. In some examples, the electric propulsion system comprises a gimbaled platform to enable the thruster to move relative to the frame. In some examples, the electric propulsion system includes a plurality of thrusters. In some examples, each of the thrusters is independently movable. In some examples, the electric propulsion system includes a tank to receive propellant. In some examples, the tank is positioned along a longitudinal axis of the frame. In some examples, the power source comprises a solar array fixed or movable between a stowed configuration and a deployed configuration. In some examples, the payload is at least partly movable between a stowed configuration and a deployed configuration. In some examples, in a stowed configuration, the apparatus is to be positioned in a launch vehicle. In some examples, the electric propulsion system includes a Xenon ion propulsion system, a plasma propulsion system, or a Hall Effect propulsion system.

An example apparatus includes a launch vehicle; and a spacecraft to be positioned in the launch vehicle, the spacecraft including a frame; a power source coupled to the frame; a payload coupled to the frame, the payload to receive or transmit data; and an electric propulsion system coupled to the frame to enable substantially all propulsion operations to be performed without a chemical propulsion system.

In some examples, the electric propulsion system comprises a thruster and a gimbaled platform, the gimbaled platform to enable the thruster to move relative to the frame. In some examples, the electric propulsion system includes a plurality of thrusters. In some examples, the electric propulsion system includes a tank to receive propellant. In some examples, the tank is positioned along a longitudinal axis of the frame. In some examples, substantially all propulsion operations include attitude control, momentum control, and orbit control of the apparatus. In some examples, orbit control includes orbit maintaining, orbit changing, orbit raising, orbit insertion, orbit re-positioning, and de-orbit maneuvers of the spacecraft.

An example apparatus includes a launch vehicle; a first module; and a second module, the first module to be removably coupled to the second module, the first and second modules to be positioned in the launch vehicle, the second module including a frame; a power source coupled to the frame; a payload coupled to the frame, the payload to receive or transmit data; and an electric propulsion system coupled to the frame, the electric propulsion system to enable attitude control, momentum control, and orbit control of the second module. In some examples, the electric propulsion system includes a tank to receive propellant. In some examples, the tank is positioned along a longitudinal axis of the frame.

An example method to improve performance of a propulsion system includes using an electric propulsion system coupled to a frame; and allowing the electric propulsion system to enable attitude control and orbit control. In some examples, using the electric propulsion system includes using a plurality of independently movable thrusters. In some examples, using the electric propulsion system includes using a propellant stored in a tank positioned along a longitudinal axis of the frame. In some examples, the method includes allowing the electric propulsion system or an attitude control system to enable momentum control. In some examples, using the electric propulsion system comprises using a Xenon ion propulsion system, a plasma propulsion system, or a Hall Effect propulsion system.

An example apparatus includes a frame; a power source coupled to the frame; a payload coupled to the frame, the payload to receive or transmit data; and an electric prolusion system coupled to the frame, the electric prolusion system comprising a first thruster coupled to a first side of the frame and a second thruster coupled to a second side of the frame, the first and second thrusters to enable attitude control, momentum control, and orbit control of the apparatus without use of another attitude system or another momentum system, no other propulsion system provided to enable the attitude control, the momentum control, and the orbit control.

In some examples, the orbit control comprises orbit maintaining, orbit changing, orbit raising, orbit insertion, orbit re-positioning, and de-orbit maneuvers of the apparatus and wherein the momentum control comprises momentum management. In some examples, the apparatus includes a controller to control the electric propulsion system. In some examples, the electric propulsion system comprises a gimbaled platform to enable the first thruster to move relative to the frame. In some examples, the first and second thrusters each comprise a plurality of thrusters. In some examples, each of the thrusters is independently movable. In some examples, the electric propulsion system comprises a tank to receive a propellant, the propellant comprising an inert gas propellant, a Xenon gas propellant, an Argon gas propellant, or a Krypton gas propellant. In some examples, the tank is positioned along a longitudinal axis of the frame. In some examples, the power source comprises a solar array fixed or movable between a stowed configuration and a deployed configuration.

In some examples, the payload is at least partly movable between a stowed configuration and a deployed configuration. In some examples, the apparatus includes a launch vehicle into which the apparatus is to be positioned in a stowed configuration. In some examples, the electric propulsion system comprises a Xenon ion propulsion system, a plasma propulsion system, or a Hall Effect propulsion system.

An example apparatus includes a launch vehicle; and a spacecraft to be positioned in the launch vehicle, the spacecraft, including a frame; a power source coupled to the frame; a payload coupled to the frame, the payload to receive or transmit data; and an electric propulsion system coupled to the frame, the electric propulsion system comprising a first thruster adjacent a first side of the frame and a second thruster adjacent a second side of the frame, the first thruster and the second thruster to enable propulsion operations to be performed, and wherein no other propulsion system is provided to enable the propulsion operations.

In some examples, the electric propulsion system comprises a gimbaled platform, the gimbaled platform to enable the first thruster and the second thruster to move relative to the frame. In some examples, the electric propulsion system comprises a tank to receive a propellant, the propellant comprising an inert gas propellant, a Xenon gas propellant, an Argon gas propellant, or a Krypton gas propellant. In some examples, the tank is positioned along a longitudinal axis of the frame. In some examples, the propulsion operations include attitude control, momentum control, and orbit control of the apparatus. In some examples, orbit control includes orbit maintaining, orbit changing, orbit raising, orbit insertion, orbit re-positioning, and de-orbit maneuvers of the spacecraft.

An example apparatus includes a launch vehicle; a first module; and a second module, the first module to be removably coupled to the second module, the first and second modules to be positioned in the launch vehicle, the second module includes a frame; a power source coupled to the frame; a payload coupled to the frame, the payload to receive or transmit data; and an electric propulsion system coupled to the frame, the electric propulsion system comprising first electric thrusters adjacent a first side of the frame and second electric thrusters adjacent a second side of the frame, the first and second electric thrusters to enable attitude control, momentum control, and orbit control of the second module, and wherein no other propulsion system is provided to enable the attitude control, the momentum control, or the orbit control.

In some examples, the electric propulsion system comprises a tank to receive propellant, the propellant comprising an inert gas propellant, a Xenon gas propellant, an Argon gas propellant, or a Krypton gas propellant. In some examples, the tank is positioned along a longitudinal axis of the frame. In some examples, an example method to improve performance of a propulsion system includes using an electric propulsion system coupled to a frame, the electric propulsion system comprising first thrusters adjacent a first side of the frame and second thrusters adjacent a second side of the frame; and allowing the first and second thrusters to enable attitude control and orbit control without using another propulsion system to enable the attitude control and the orbit control, no other propulsion system provided to enable the attitude control and the orbit control.

In some examples, using the first and second thrusters comprises using a plurality of independently movable thrusters. In some examples, using the electric propulsion system comprises using a propellant stored in a tank positioned along a longitudinal axis of the frame, the propellant comprising an inert gas propellant, a Xenon gas propellant, an Argon gas propellant, or a Krypton gas propellant. In some examples, the method allowing the electric propulsion system or an attitude control system to enable momentum control. In some examples, using the electric propulsion system comprises using a Xenon ion propulsion system, a plasma propulsion system, or a Hall Effect propulsion system. In some examples, the method includes a support interface to couple the tank to the frame. In some examples, the support interface is to transfer a launch load from the tank to the frame. In some examples, the support interface comprises a conical support interface.

In some examples, an example apparatus includes a frame; a power source coupled to the frame; a payload coupled to the frame, the payload to receive or transmit data; and an electric propulsion system coupled to the frame, the electric propulsion system comprising a first thruster and a second thruster, the first thruster positioned adjacent a first side of the frame and the second thruster positioned adjacent a second side of the frame, the second side spaced from the first side, the first and second thrusters to enable attitude control and momentum control to be performed without use of another attitude system, orbit control system, or momentum system, no other propulsion control system provided to enable the attitude control and the momentum control.

In some examples, the tank further includes a cap having a slip joint to enable the tank to expand or contract. In some examples, the first module and the second module are removably coupled to enable the first and second modules to be launched in tandem. In some examples, the support interface is coupled to the tank via a pivotal mount to reduce a thrust load imparted onto a portion of the frame.

An example method including deploying a space vehicle including an electric propulsion system; and using the electric propulsion system for attitude control and orbit control, no other propulsion system provided to enable the attitude control and the orbit control. In some examples, the space vehicle is a satellite. In some examples, the method includes launching a launch vehicle in which the space vehicle is disposed. In some examples, the electric propulsion system includes first thrusters adjacent a first side of the space vehicle and second thrusters adjacent a second side of the space vehicle. In some examples, the method includes using the electric propulsion system for momentum control, no other propulsion system provided to enable momentum control. In some examples, the method includes independently moving thrusters of the electric propulsion system.

An example method includes launching a launch vehicle including a first space vehicle and a second space vehicle, the first space vehicle including a first electric propulsion system, the second space vehicle including a second electric propulsion system; deploying the first space vehicle and the second vehicle from the launch vehicle; and using the first electric propulsion system for attitude control and orbit control of the first space vehicle, no other propulsion system provided on the first space vehicle to enable the attitude control and the orbit control. In some examples, the method includes using the second electric propulsion system for attitude control and the orbit control of the second space vehicle, no other propulsion system provided on the second space vehicle to enable the attitude control and the orbit control. In some examples, the method includes using the first electric propulsion system for momentum control of the first space vehicle, no other propulsion system provided on the first space vehicle to enable momentum control. In some examples, the method includes independently moving thrusters of the first electric propulsion system.

An example apparatus includes a space vehicle, including an electric propulsion system; and a processor to cause the electric propulsion system to enable attitude control and orbit control without using another propulsion system to enable the attitude control and the orbit control. In some examples, the orbit control includes orbit maintaining, orbit changing, orbit raising, orbit insertion, orbit re-positioning, and de-orbit maneuvers of the apparatus. In some examples, the electric prolusion system includes a first thruster coupled to a first side of the space vehicle and a second thruster coupled to a second side of the space vehicle. In some examples, the electric propulsion system includes a tank to receive a propellant, the propellant including an inert gas propellant, a Xenon gas propellant, an Argon gas propellant, or a Krypton gas propellant. In some examples, the tank is positioned along a longitudinal axis of the space vehicle. In some examples, the apparatus includes a power source, the power source to provide power to one or more components of the space vehicle. In some examples, the power source includes a solar array fixed or movable between a stowed configuration and a deployed configuration. In some examples, the electric propulsion system includes a Xenon ion propulsion system, a plasma propulsion system, or a Hall Effect propulsion system. In some examples, the space vehicle excludes a chemical propulsion system. In some examples, the electric prolusion system includes a first thruster, a second thruster, a third thruster, and a fourth thruster, the first, second, third, and fourth thrusters being disposed adjacent respective corners of the space vehicle.

An example method includes deploying a space vehicle including an electric propulsion system; and using the electric propulsion system for attitude control, momentum control, and orbit control of the space vehicle, no other propulsion system provided on the space vehicle to enable any of the attitude control, the momentum control, or the orbit control.

In some examples, the space vehicle is a satellite. In some examples, the method includes launching a launch vehicle in which the space vehicle is disposed. In some examples, the electric propulsion system includes first thrusters adjacent a first side of the space vehicle and second thrusters adjacent a second side of the space vehicle opposite the first side. In some examples, the method includes independently moving thrusters of the electric propulsion system. In some examples, no other thrusters are positioned on the space vehicle between the first thrusters and the second thrusters.

An example method includes launching a launch vehicle including a first space vehicle and a second space vehicle, the first space vehicle including a first electric propulsion system, the second space vehicle including a second electric propulsion system; deploying the first space vehicle and the second space vehicle from the launch vehicle; and using the first electric propulsion system for attitude control, momentum control, and orbit control of the first space vehicle, no other propulsion system provided on the first space vehicle to enable any of the attitude control, the momentum control, or the orbit control. In some examples, the method includes using the second electric propulsion system for attitude control, momentum control, and the orbit control of the second space vehicle, no other propulsion system provided on the second space vehicle to enable any of the attitude control, the momentum control, or the orbit control. In some examples, the method includes independently moving thrusters of the first electric propulsion system. In some examples, the electric propulsion system of the first space vehicle includes first thrusters adjacent a first side of the first space vehicle and second thrusters adjacent a second side of the first space vehicle opposite the first side, and wherein no other thrusters are positioned on the first space vehicle between the first thrusters and the second thrusters.

An example apparatus includes a space vehicle, including: an electric propulsion system; and a processor to cause the electric propulsion system to enable attitude control, momentum control and orbit control of the space vehicle, no other propulsion system provided on the space vehicle to enable any of the attitude control, the momentum control, or the orbit control.

In some examples, the orbit control includes orbit maintaining, orbit changing, orbit raising, orbit insertion, orbit re-positioning, and de-orbit maneuvers of the apparatus. In some examples, the electric prolusion system includes a first thruster coupled to a first side of the space vehicle and a second thruster coupled to a second side of the space vehicle. In some examples, the electric propulsion system includes a tank to receive a propellant, the propellant including an inert gas propellant, a Xenon gas propellant, an Argon gas propellant, or a Krypton gas propellant. In some examples, the tank is positioned along a longitudinal axis of the space vehicle. In some examples, the apparatus includes a power source, the power source to provide power to one or more components of the space vehicle. In some examples, the power source includes a solar array fixed or movable between a stowed configuration and a deployed configuration. In some examples, the electric propulsion system includes a Xenon ion propulsion system, a plasma propulsion system, or a Hall Effect propulsion system. In some examples, the electric prolusion system includes a first thruster, a second thruster, a third thruster, and a fourth thruster, the first, second, third, and fourth thrusters being disposed adjacent respective corners of the space vehicle. In some examples, the electric propulsion system of the space vehicle includes first thrusters adjacent a first side of the space vehicle and second thrusters adjacent a second side of the space vehicle opposite the first side, and wherein no other thrusters are positioned on the space vehicle between the first thrusters and the second thrusters.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:
1. An apparatus comprising:
   means to use an electric propulsion system coupled to a frame of a spacecraft, the electric propulsion system including a tank and at least a first thruster and a second thruster, the first thruster adjacent a first side of the frame, the second thruster adjacent a second side of the frame, the tank to store one or more propellants, the tank having a first end and a second end opposite the first end, the first end coupled to the spacecraft via a first pivotable mount, the second end coupled to the spacecraft via a second pivotable mount; and
   means to allow at least one of the first thruster or the second thruster for momentum control of the spacecraft, no other propulsion system than the electric propulsion system provided on the spacecraft for control of the spacecraft including the momentum control.

2. The apparatus of claim 1, wherein at least one of the first thruster or the second thruster is at least one of an independently movable thruster or an independently rotatable thruster.

3. The apparatus of claim 1, wherein at least one of the first thruster or the second thruster is an electrostatic ion thruster or a Hall effect thruster.

4. The apparatus of claim 1, wherein the means to use the electric propulsion system includes using the one or more propellants stored in the tank, the tank positioned along a longitudinal axis of the frame, the one or more propellants including at least one of an inert gas propellant, an Argon gas propellant, a Mercury gas propellant, a Krypton gas propellant, or a Xenon gas propellant.

5. The apparatus of claim 1, further including means to allow at least one of the first thruster or the second thruster for at least one of attitude control or orbit control of the spacecraft.

6. The apparatus of claim 1, wherein the electric propulsion system is a Hall effect propulsion system, a plasma propulsion system, or a Xenon ion propulsion system.

7. The apparatus of claim 1, further including means to control the spacecraft by using at least one of one or more magnetic torque rods, one or more magnetic torque rings, or one or more control wheels.

8. An apparatus comprising:
means to deploy a space vehicle, the space vehicle including an electric propulsion system, the electric propulsion system including a tank to store one or more propellants, the tank including a first end and a second end opposite the first end, the first end coupled to the space vehicle via a first pivotable mount, the second end coupled to the space vehicle via a second pivotable mount; and
means to use the electric propulsion system for momentum control of the space vehicle, no other propulsion system than the electric propulsion system provided on the space vehicle for control of the space vehicle including the momentum control.

9. The apparatus of claim 8, wherein the electric propulsion system includes at least a first thruster, a second thruster, a third thruster, and a fourth thruster, the first, second, third, and fourth thrusters being disposed adjacent respective corners of the space vehicle.

10. The apparatus of claim 8, wherein the electric propulsion system includes first thrusters adjacent a first side of the space vehicle and second thrusters adjacent a second side of the space vehicle opposite the first side, and wherein no other thrusters are positioned on the space vehicle between the first thrusters and the second thrusters.

11. The apparatus of claim 8, further including:
means to use the electric propulsion system for orbit control, the orbit control including at least one of orbit maintaining, orbit changing, orbit raising, orbit insertion, orbit re-positioning, or de-orbit maneuvers of the apparatus; and
means to use the electric propulsion system for attitude control.

12. The apparatus of claim 8, wherein the space vehicle is a first space vehicle and further including means to launch a launch vehicle in which at least one of the first space vehicle or a second space vehicle are disposed.

13. The apparatus of claim 8, further including means to power the space vehicle, the means including one or more power sources, the one or more power sources to provide power to one or more components of the space vehicle, the one or more power sources including at least one of a solar array, a radioactive thermonuclear generator, an energy beaming apparatus, an energy transfer apparatus, a solar thermal apparatus, or a nuclear thermal apparatus.

14. The apparatus of claim 13, wherein the solar array is fixed or movable between a stowed configuration and a deployed configuration of the space vehicle.

15. An apparatus comprising:
a space vehicle including:
one or more sensors;
an electric propulsion system, the electric propulsion system including a tank to store one or more propellants, the tank configured to have a first end and a second end opposite the first end, the first end coupled to the space vehicle via a first pivotable mount, the second end coupled to the space vehicle via a second pivotable mount; and
a controller, the controller to:
cause linear acceleration of the space vehicle by controlling the electric propulsion system based on one or more measurements from the one or more sensors; and
cause a momentum control maneuver of the space vehicle by controlling the electric propulsion system based on the one or more measurements, no other propulsion system than the electric propulsion system provided on the space vehicle for control maneuvers of the space vehicle including the momentum control maneuver.

16. The apparatus of claim 15, wherein the electric propulsion system includes at least a first thruster and a second thruster, the first thruster and the second thruster being at least one of independently movable or independently rotatable to cause the linear acceleration.

17. The apparatus of claim 16, wherein the controller causes the linear acceleration by adjusting a position of at least one of the first thruster or the second thruster.

18. The apparatus of claim 15, wherein the space vehicle is a first space vehicle, further including a launch vehicle, the launch vehicle including the first space vehicle and a second space vehicle, the first space vehicle coupled to the second space vehicle in a stacked arrangement.

19. The apparatus of claim 15, further including a power source, the power source including at least one of a solar array, a radioactive thermonuclear generator, an energy beaming apparatus, an energy transfer apparatus, a solar thermal apparatus, or a nuclear thermal apparatus.

20. The apparatus of claim 15, wherein the one or more sensors include at least one of an attitude sensor or an inertial sensor, the attitude sensor including at least one of an earth sensor, a sun sensor, or a star tracker.

* * * * *